United States Patent

Ono et al.

[11] Patent Number: 5,982,982
[45] Date of Patent: *Nov. 9, 1999

[54] VIDEO SIGNAL PROCESSING APPARATUS

[75] Inventors: Tadashi Ono, Kyoto; Hiroyuki Uenaka, Akashi; Akira Iketani, Higashiosaka; Masaaki Kobayashi, Kawanishi; Souichirou Fujioka, Sakai; Masataka Higuchi, Osaka; Junji Yoshida, Kyoto, all of Japan

[73] Assignee: Matsushita Electric Industrial Co., Ltd., Kadoma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/676,826

[22] Filed: Jul. 8, 1996

[30] Foreign Application Priority Data

| Jul. 13, 1995 | [JP] | Japan | 7-177062 |
| Aug. 22, 1995 | [JP] | Japan | 7-213201 |
| Dec. 15, 1995 | [JP] | Japan | 7-347833 |

[51] Int. Cl.⁶ .......................... H04N 5/917; H04N 7/26
[52] U.S. Cl. .......................... 386/109; 386/111
[58] Field of Search .......................... 386/46, 95, 96, 386/106, 109, 112, 111, 1, 126, 124, 33, 39, 52; 360/32; 348/384, 393, 400, 408; H04N 5/917, 7/26

[56] References Cited

U.S. PATENT DOCUMENTS

| 4,777,537 | 10/1988 | Ueno et al. | 386/96 |
| 5,048,111 | 9/1991 | Jones et al. | |
| 5,126,851 | 6/1992 | Yoshimura et al. | 386/46 |
| 5,239,308 | 8/1993 | Keesen | 386/111 |
| 5,377,051 | 12/1994 | Lane et al. | 360/33.1 |
| 5,570,199 | 10/1996 | Tanaka et al. | 386/95 |
| 5,642,460 | 6/1997 | Shimoda | 386/68 |

FOREIGN PATENT DOCUMENTS

| 0634868 | 1/1985 | European Pat. Off. . |
| 0572228 | 12/1993 | European Pat. Off. . |
| 0606857 | 7/1994 | European Pat. Off. . |
| 0613297 | 8/1994 | European Pat. Off. . |
| 0629085 | 12/1994 | European Pat. Off. . |
| 0634876 | 1/1995 | European Pat. Off. . |
| 0692916 | 1/1996 | European Pat. Off. . |
| 486183 | 3/1992 | Japan . |
| 5101609 | 4/1993 | Japan . |
| 7123355 | 5/1995 | Japan . |
| 9207359 | 4/1992 | WIPO . |

OTHER PUBLICATIONS

European Search Report dated Nov. 10, 1997, for European Patent Application Serial No. 96111079.8.

*Primary Examiner*—Robert Chevalier
*Attorney, Agent, or Firm*—Renner, Otto, Boisselle & Sklar, P.L.L.

[57] ABSTRACT

The video signal processing apparatus of the invention includes a representative component extractor which receives a video signal including a signal representing representative components and a signal representing non-representative components, thereby extracting the signal representing the representative components from the video signal.

13 Claims, 26 Drawing Sheets

FIG. 6
(a) 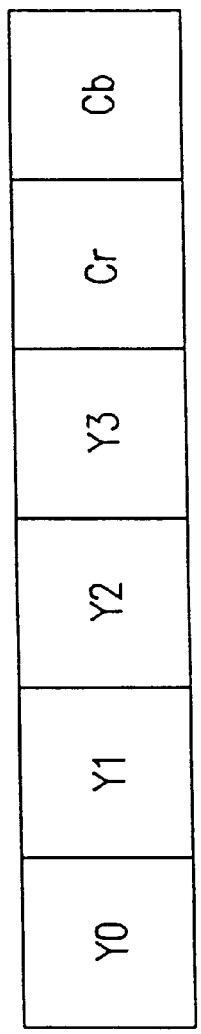
(b) 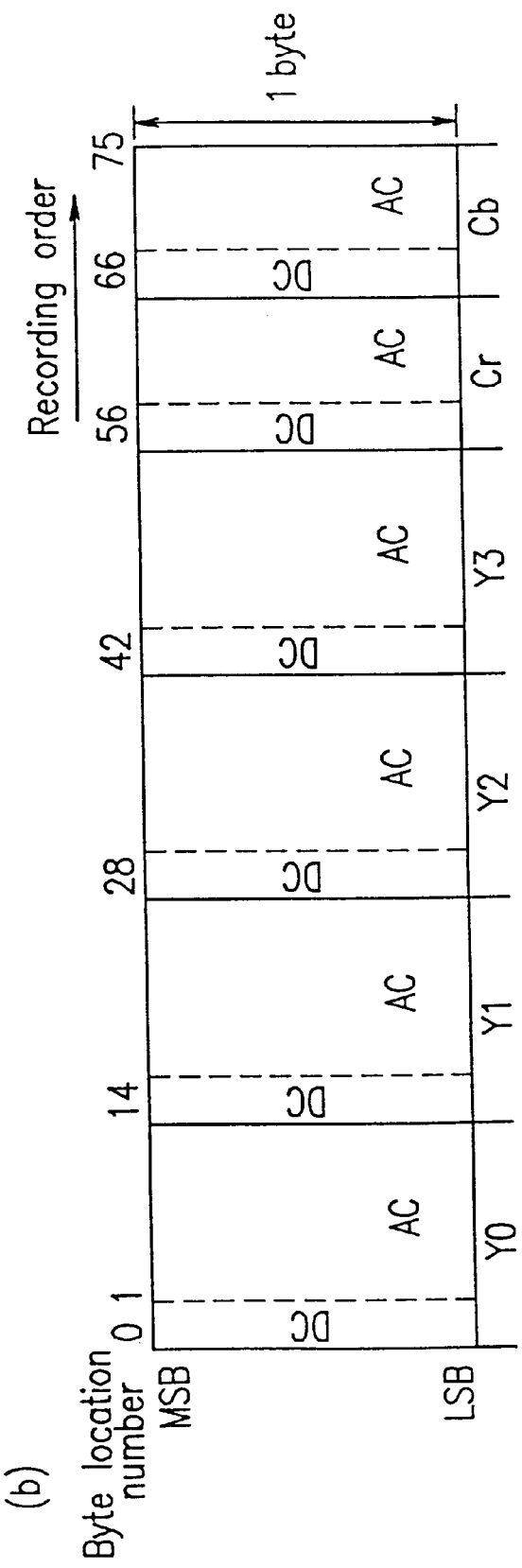

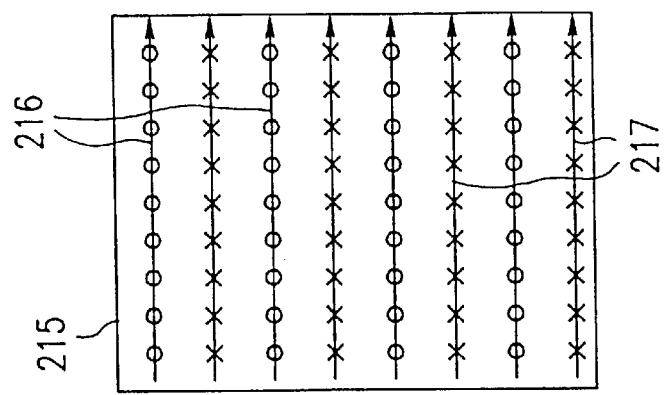
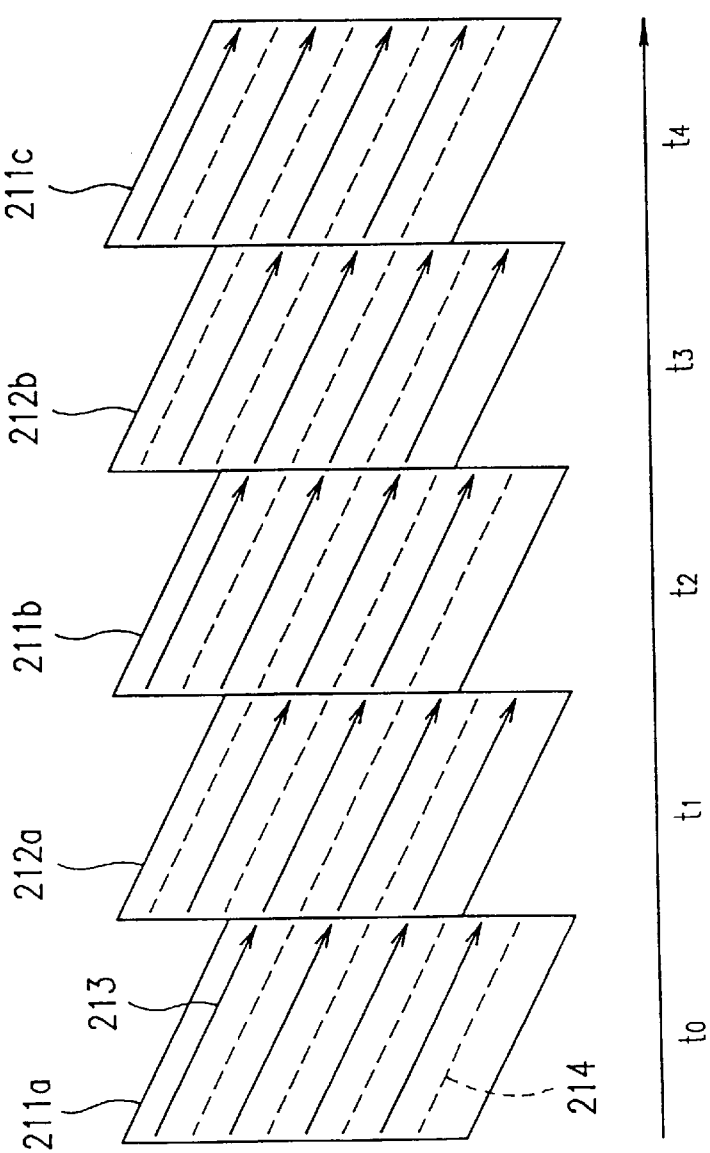
FIG. 21

VIDEO SIGNAL PROCESSING APPARATUS

BACKGROUND OF THE INVENTION

1. Field of the Invention

The present invention relates to a video signal processing apparatus for performing display, recording, transmission or editing when a video signal is supplied thereto.

2. Description of the Related Art

For efficiently recording or transmitting a video signal, technologies for encoding a video signal with high efficiency have conventionally played an important role. On the other hand, a method in which a video signal is decoded to be displayed is generally employed for recognizing the contents of the high-efficiency encoded video signal.

It has recently been required more and more to recognize the contents of the encoded video signal (a video signal recorded on a magnetic tape, in particular) at a higher speed.

High-speed reproduction is utilized as an exemplary method for recognizing the contents of an encoded video signal which has been recorded on a magnetic tape. High-speed reproduction is a method In which a tape transport speed is set to be faster and video data covering a plurality of frames is decoded while regarding the video data as one frame. This method is described in a document such as Japanese Laid-Open Patent Publication No. 4-86183.

Another exemplary method for recognizing the contents of a recorded video signal more easily and at a higher speed is a method in which only representative video signals are extracted to be displayed. For example, in Japanese Laid-Open Patent Publication No. 7-123355, a method, in which not only data for a normal reproducing operation are recorded but also DC components obtained by subjecting respective blocks to a discrete cosine transform (DCT) are separately recorded as data for a high-speed reproducing operation, expanded, filtered and then displayed, is disclosed.

However, in accordance with the contents disclosed in Japanese Laid-Open Patent Publication No. 4-86183, it is true that the recorded contents can be recognized at a higher speed, but the data for high-speed reproducing operation are required to be decoded. In addition, since a video signal obtained by performing the high-speed reproducing operation covers a plurality of frames, such a video signal cannot be edited on a frame basis.

On the other hand, in accordance with the contents disclosed in Japanese Laid-Open Patent Publication No. 7-123355, not only data for normal reproducing operation are saved but also the DC components of respective blocks are separately saved as data for high-speed (plain) reproducing operation, so that data having the same contents are recorded twice and an extra recording region is required for saving the DC components.

Next, in the case of transmitting a video signal, if an image included in an arbitrary frame in a moving picture is transmitted as single image data, then it is not always necessary to transmit all the data in real time, so that such image date can be sufficiently transmitted even by the use of a transmission line, of which the transmission capacity is not so large (e.g., a telephone line). However, in the case of transmitting a moving picture, even if the moving picture is subjected to high-efficiency encoding, the types of usable transmission lines are considerably limited and high-speed lines used for a satellite communication or the like is required to be used.

Furthermore, as a method for editing a video signal, a tape-to-tape editing operation using a video tape recorder (VTR) has conventionally been very popular. Moreover, for improving the applicability of an expensive VTR for broadcasting use, an off-line editing method, in which materials are once dubbed onto a cheap tape to produce a working tape; an editing rehearsal is performed on the working tape; and then a decisive editing operation is performed using a finally determined decision list, has been used frequently. In the tape-to-tape editing (linear editing) operation, it takes an enormous amount of time to access to desired cuts or modify the edited contents. However, thanks to recent remarkable development in computer technologies and magnetic disk technologies, various editing apparatuses, in which the materials recorded on a tape are once stored onto a hard disk and an editing (nonlinear editing) operation is performed on the hard disk having excellent accessibility, have been proposed and some of them have already been put into practical use. Nevertheless, the recording capacity of a hard disk is generally far smaller than that of a tape shaped medium and the unit cost of such a medium is high. Thus, a hybrid editing apparatus using a tape system advantageous in the recording capacity and the cost of the medium and a disk system having excellent accessibility in combination has been proposed.

For example, in Japanese Laid-Open Patent Publication No. 5-101609, technologies for complementarily compensating for poor accessibility of a tape system and a small recording capacity of a disk system by unitary management, in which the addresses of video signals on a tape and the addresses of video signals on a disk are associated with each other by recording on the disk a part of respective scenes recorded on the tape (in general, video signals corresponding to several minutes at the beginning and at the end of each scene), are disclosed. Moreover, in Japanese Laid-Open Patent Publication No. 5-101609, an editing method, in which known video compression technologies are utilized for recording a video signal onto a disk, an editing decision list is produced by performing a nonlinear off-line editing operation and then a, tape-to-tape decisive editing operation is performed, is disclosed.

However, a conventional hybrid editing apparatus is assumed to use an analog recording type VTR or a non-compression type digital VTR as the VTR thereof in principle. In recent years, remarkable development in the video compression technologies has realized a VTR which can provide a video of permissible quality for broadcasting. In addition, a compression type digital VTR incorporating such video compression technologies therein has also been proposed.

Since a conventional hybrid editing apparatus requires two video compressor/expanders, that is to say, a video compressor/expander used for recording a video signal onto a disk and a video compressor/expander of a compression type digital VTR, the cost of such an apparatus becomes adversely high and the size of the hardware thereof is disadvantageously increased. For example, it is not impossible to use a video compressor/expander in common for fulfilling the two requirements. However, though the video compression technologies have been developed, a data rate of at least several tens of Mbps is generally required for providing a video of permissible quality for broadcasting. Therefore, except for the method in which a part of the materials are stored into a disk, it has been difficult to realize a commonly usable video compressor/expander in view of the recording capacity of a disk.

SUMMARY OF THE INVENTION

According to the present invention, a video signal processing apparatus is provided. The video signal processing apparatus includes: a representative component extractor which receives a video signal including a signal representing representative components and a signal representing non-representative components, thereby extracting the signal representing the representative components from the video signal.

In one embodiment, the video signal processing apparatus further includes a recorder for recording the representative components onto a recording medium.

In another embodiment, the video signal processing apparatus further includes a display unit for displaying the representative components thereon.

In still another embodiment, the representative component extractor includes: a flag determiner for detecting a flag adjacent to the representative components which are included in a data stream representing the video signal; and a switch for outputting the data stream in response to the detection of the flag.

In still another embodiment, the video signal processing apparatus further includes a transmitter for outputting the signal representing the representative components to a transmission line.

In still another embodiment, the video signal processing apparatus further includes: a recorder for recording the signal representing the representative components onto a recording medium; and a selector for selecting transmission frames, to be output to the transmission line, from the signal which has been recorded on the recording medium and represents the representative components.

In still another embodiment, the video signal processing apparatus further includes: a magnetic tape reproducer for reproducing the video signal which includes a signal representing the representative components and a signal representing the non-representative components and has been recorded on a magnetic tape; a tape transport motor for transporting the magnetic tape; and a tape transport controller for controlling a tape running speed of the magnetic tape.

In still another embodiment, the video signal processing apparatus further includes: a decoder for receiving an encoded video signal, decoding the encoded video signal and outputting the decoded video signal; and an encoder for receiving the decoded video signal and subjecting the decoded video signal to a discrete cosine transform, thereby reproducing a video signal including the signal representing the representative components and a signal representing the non-representative components and outputting the video signal to the representative component extractor.

In still another embodiment, the video signal processing apparatus further includes a compressor for compressing the signal representing the representative components.

In still another embodiment, the video signal processing apparatus further includes a transmitter for outputting a signal output from the compressor to a transmission line.

According to another aspect of the present invention, a video signal processing apparatus is provided. The video signal processing apparatus includes: a magnetic tape reproducer for reproducing and outputting a video signal which includes a signal representing representative components and a signal representing non-representative components and has been recorded on a magnetic tape; a representative component extractor for receiving the video signal and extracting the signal representing the representative components from the video signal; a disk recorder for recording the signal representing the representative components onto a disk recording medium; a disk reproducer for reproducing the signal representing the representative components from the disk recording medium: and an editing region setter for controlling a reproducing operation of the magnetic tape reproducer.

In one embodiment, the video signal processing apparatus further includes a magnetic tape recorder for recording the video signal output from the magnetic tape reproducer.

According to still another aspect of the present invention, a video signal processing apparatus is provided. The video signal processing apparatus includes: a frame signal extractor for receiving a video signal which includes a signal representing representative components and a signal representing non-representative components, thereby outputting a signal representing at least one frame; a representative component extractor for receiving the video signal and extracting the signal representing the representative components from the video signal; and a selector for receiving a signal output from the frame signal extractor and a signal output from the representative component extractor and selectively outputting one of these signals in accordance with an externally input control signal.

According to still another aspect of the present invention, a video signal processing apparatus is provided. The video signal processing apparatus includes: a non-representative component supplementer for receiving a signal representing representative components, thereby supplementing a signal representing non-representative components; a frame signal processor for receiving a video signal and outputting a signal representing at least one frame; and a selector for receiving a signal output from the non-representative component supplementer and a signal output from the frame signal processor and selectively outputting one of these signals in accordance with an externally input control signal.

Thus, the invention described herein makes possible the advantage of providing a video signal processing apparatus which can recognize the contents of a supplied video signal at a high speed; reduce the recording capacity; and transmit a video signal at a practically permissible rate even through a transmission line having a relatively small transmission capacity by performing display, recording or transmission while extracting only the representative components of a supplied video signal which hap been separated into a signal representing the representative components and a signal representing non-representative components.

These and other advantages of the present invention will become apparent to those skilled in the art upon reading and understanding the following detailed description with reference to the accompanying figures.

BRIEF DESCRIPTION OF THE DRAWINGS

FIG. 6 schematically shows blocks and a recording format for a video signal.

FIG. 21 is a diagram for illustrating the twelfth example of the present invention.

DESCRIPTION OF THE PREFERRED EMBODIMENTS

Figure 1:
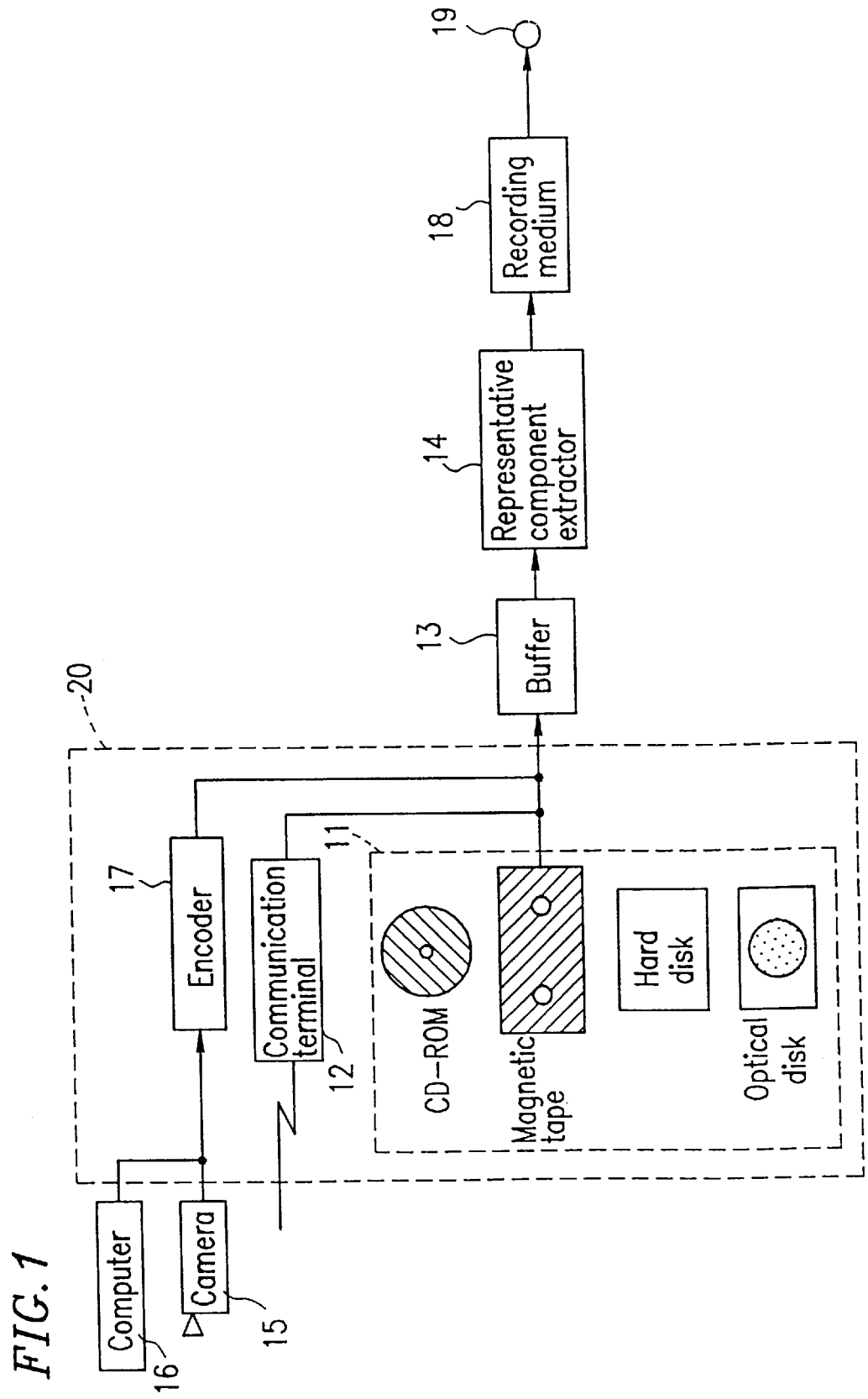
FIG. 1 is a block diagram for a video signal processing apparatus in a first example of the present invention.

Hereinafter, the embodiments of the present invention will be described with reference to the accompanying drawings, in which the same reference numerals denote the same components throughout the following examples.

EXAMPLE 1

FIG. 1 is a block diagram for a video signal processing apparatus in a first example of the present invention. In FIG. 1, the reference numeral 11 denotes a storage medium in which an encoded video signal has been recorded; 12 denotes a communication terminal; 13 denotes a buffer; 14 denotes a representative component extractor; 15 denotes a camera: 16 denotes a computer; 17 denotes an encoder; 18 denotes a recording medium; and 19 denotes a display output terminal. As the storage medium, a CD-ROM, a magnetic tape, a hard disk, an optical disk or the like can be used. The storage medium 11, the communication terminal 12 and the encoder 17 will be inclusively called an encoded video supply section 20.

Hereinafter, the operation in the first example will be described.

An encoded video signal which has been separated into representative components and non-representative components other than the representative components is supplied from the storage medium 11 or the communication terminal 12 and then held in the buffer 13. Herein, the "representative components" mean the direct-current (DC) components obtained when an image is subjected to a discrete cosine transform (DCT) on an 8×8 pixel block basis, while the "non-representative components" mean non-DC components or alternating current (AC) components.

The data held in the buffer 13 is supplied to the representative component extractor 14 on a frame basis. On the other hand, a video signal recorded by the camera 15 or an image file (e.g., a bit map file) on the computer 16 is encoded by the encoder 17 so as to be separated into representative components and non-representative components, other than the representative components, and then supplied to the representative component extractor 14. The representative component extractor 14 extracts only the representative components from the video signal in such a format. The extracted representative components are recorded onto the recording medium 18, and the recorded representative components are converted by the display output terminal 19 into an image and then displayed.

Figure 2:
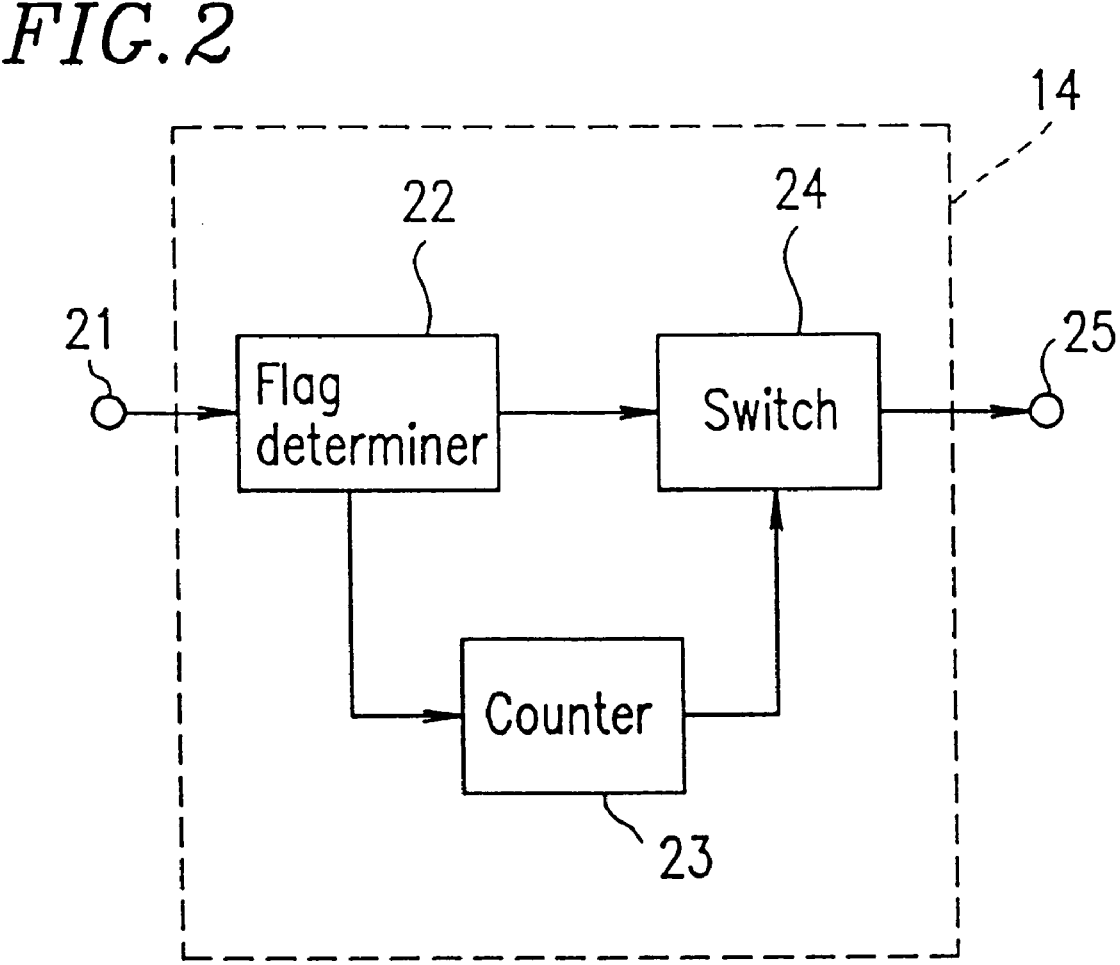
FIG. 2 is a block diagram for a representative component extractor 14.

FIG. 2 is a block diagram for the representative component extractor 14. In FIG. 2, the reference numeral 21 denotes an input terminal; 22 denotes a flag determiner; 23 denotes a counter; 24 denotes a switch; and 25 denotes an output terminal. In describing this operation, it is assumed that a video signal is supplied in a format shown in FIG. 3, in which, after top data is placed at the top, representative components having a fixed length of "a" bits and non-representative components having a fixed length of "b" bits are located in this order. However, even when these components do not have a fixed length, the format of the video signal is not limited to that shown in FIG. 3 so long as the representative components can be detected by any method.

Figure 3:
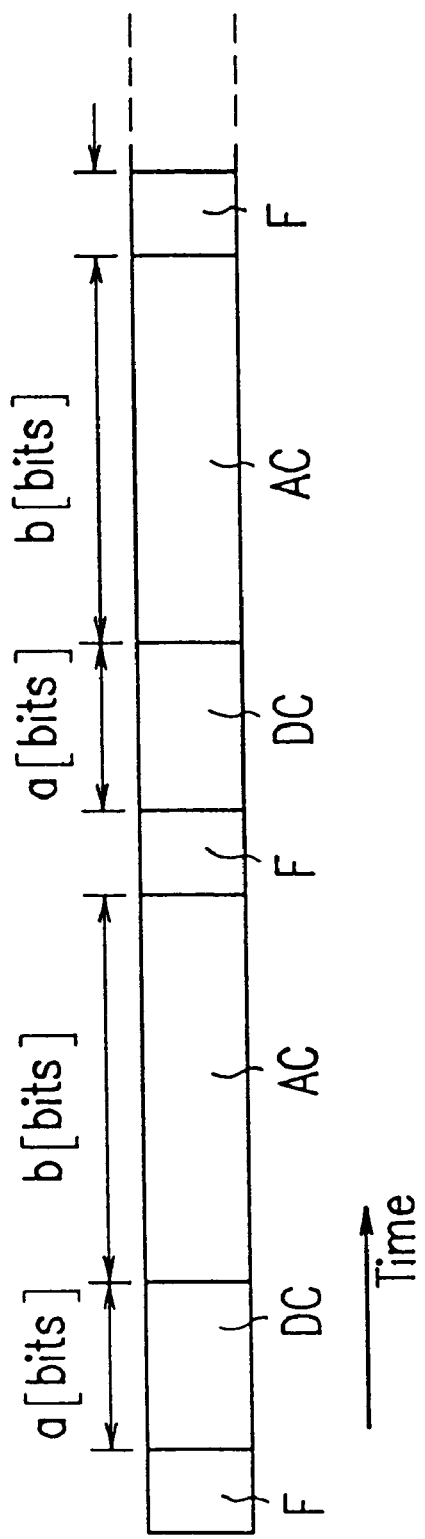
FIG. 3 is a format chart schematically showing a data stream of, an input video signal.

FIG. 3 is format chart schematically showing a data stream of an input video signal. In FIG. 3, "F", "DC" and "AC" denote a flag, representative components and non-representative components, respectively. If, when a video signal in the format such as that shown in FIG. 3 is input through the input terminal 21 to the flag determiner 22, top data (i.e., a flag) is supplied from the flag determiner 22, then a zero clear signal is sent to the counter 23, thereby resetting the value "c" of the counter 23 at "0". On the other hand, if top data has not been detected, then "1" is added to the value "c" of the counter 23. If $c \leq a$, since the input is composed of representative component bits, the counter 23 supplies an ON signal to the switch 24, which in turn supplies the input bits to the output terminal 25. On the other hand, if $a < c \leq a + b$, since the input is composed of non-representative component bits, the counter 23 supplies an OFF signal to the switch 24, which does not supply the input bits to the output terminal 25.

When the value "c" of the counter 23 reaches "a+b", the bits to be supplied next time are representative components. Thus, before the next bits are supplied, the value "c" of the counter 23 is reset at "0". Thereafter, in a similar manner to the above-described operation, the next representative components are supplied to the output terminal 25.

As described above, in the first example of the present invention, when a video signal which has been separated into representative components and non-representative components other than the representative components is supplied from any of various branches of the encoded video supply section 20, it is possible to extract and display or record only the representative components from the video signal in such a format.

In this example, the representative components which have been recorded On the recording medium 18 are output and displayed. Alternatively, the representative components may be directly output and displayed from the representative component extractor 14. In addition, the display output terminal 19 may be removed from the configuration shown in FIG. 1.

Moreover, various types of monitors can be used as the display output terminal 19. That is to say, not only a commonly used interlace type monitor but also a non-interlace type monitor including a VGA card (e.g., a personal computer monitor), a projector and the like can be used.

Furthermore, the buffer 13 may be a nonvolatile storage medium such as a hard disk, as well as a volatile storage medium such as a RAM.

Furthermore, when the threshold value of the counter 23 is set to be "a" as done in this example, the representative components can be extracted directly. However, if the capacity is required to be further reduced in recording or transmitting a video signal, the threshold value may be set to be "a" or less.

EXAMPLE 2

Figure 4:
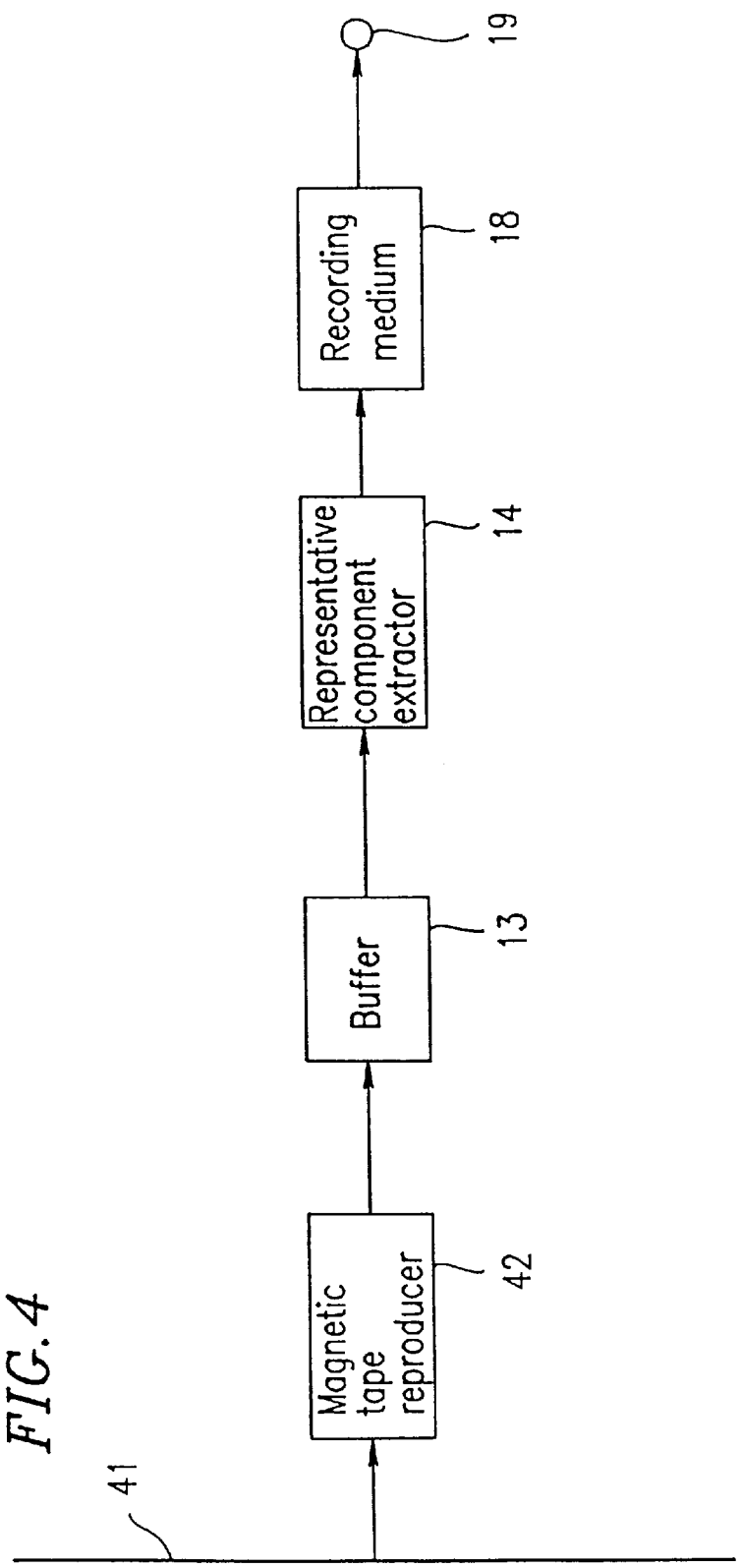
FIG. 4 is a block diagram for a video signal processing apparatus in a second example of the present invention.

FIG. 4 is a block diagram for a video signal processing apparatus in a second example of the present invention. In the following examples, but for some special limitation, it will always be assumed that a magnetic tape is used in an encoded video signal supply section 20; that DC components, obtained by subjecting the respective blocks, into which a video signal has been divided such that each block is composed of 8 horizontal pixels×8 vertical pixels, to a discrete cosine transform (DCT), are used as representative components; and that the DC components in the respective blocks are recorded in a fixed region on the magnetic tape. However, the same effects can be naturally attained even by the use of any other encoded video signal supply section.

In FIG. 4, the reference numeral 41 denotes a magnetic tape; and 42 denotes a magnetic tape reproducer.

Hereinafter, the operation in the second example will be described.

Data which has been recorded on the magnetic tape 41 is read out by the magnetic tape reproducer 42; and then held in the buffer 13 until data corresponding to one frame has been read out. Only the DC components are extracted by the representative component extractor 14 from the data held in the buffer 13 and then recorded onto the recording medium 18. The recorded DC components are converted by the display output terminal 19 into an image and then displayed.

Figure 5:
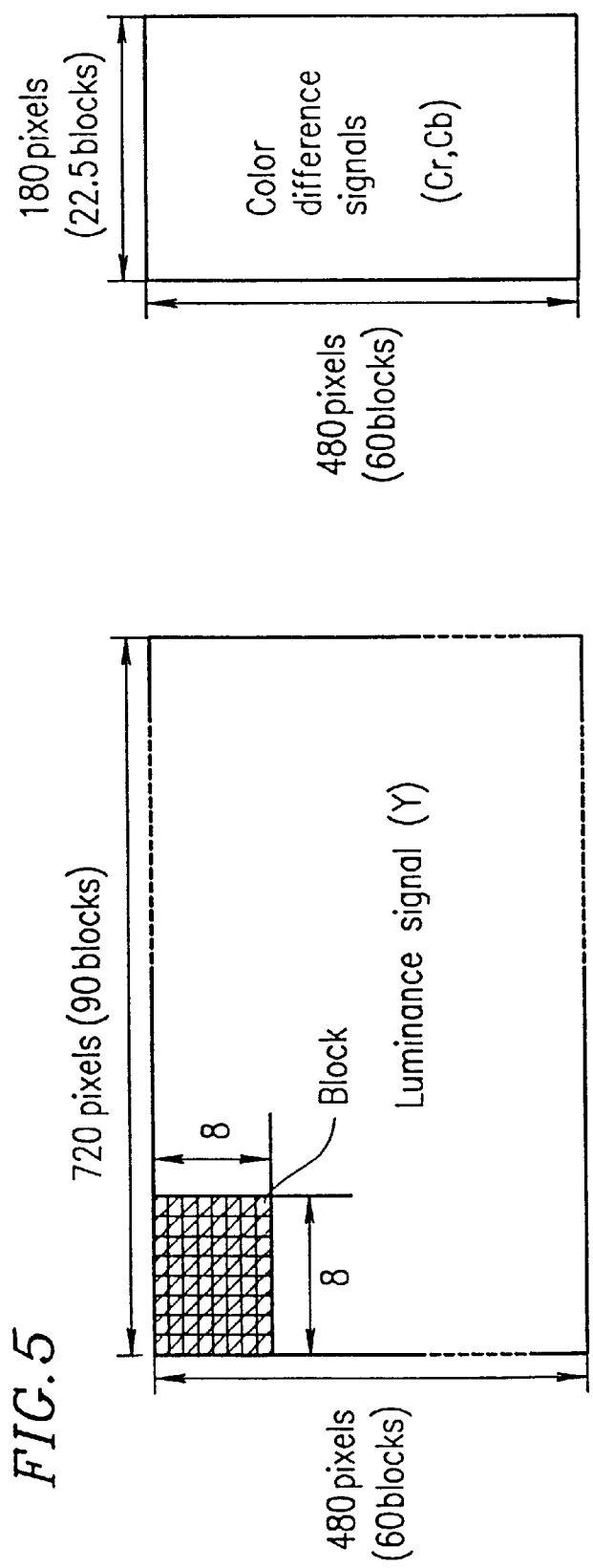
FIG. 5 is a diagram showing an exemplary configuration for one frame of an NTSC type digital video signal.

FIG. 5 is a diagram showing an exemplary structure for one frame of an NTSC type digital video signal. A luminance signal (Y) is composed of 720 horizontal pixels×480 vertical pixels, while each of a first color difference signal (Cr) and a second color difference signal (Cb) is composed of 180 horizontal pixels×480 vertical pixels.

An exemplary method for recording these signals will be described below. First, each luminance signal and each of the two color difference signals are divided into a plurality of blocks such that each block is composed of 8 horizontal pixels×8 vertical pixels. FIG. 6 schematically shows the blocks and a recording format of a video signal. A pixel number ratio among the luminance signals, the first color difference signal and the second color difference signal is 4:1:1 in the horizontal direction. Thus, as shown in the portion (a) of FIG. 6, a macroblock composed of 4 Y blocks, 1 Cr block and 1 Cb block which are located in the same region on the screen can be formed. Next, the respective blocks are subjected to the discrete cosine transform (DCT). The coefficients obtained by the DCT are separated into DC components and AC components. Of these components, the AC components are divided at an appropriate quantization step so as to be variable-length encoded.

The portion (b) of FIG. 6 shows an exemplary recording region on a recording medium, in which region video data corresponding to one macroblock is recorded. Y0 to Y4, Cr and Cb compose one macroblock corresponding to that shown in the portion (a) of FIG. 6. This recording region has a fixed length. In this region, data corresponding to one byte (or eight bits) is recorded in the vertical direction such that the most significant bit (MSB) is located in the highest part of this figure and byte location numbers are sequentially applied in the horizontal direction. Encoded data is first recorded from the MSB to the least significant bit (LSB) in the vertical direction and then recorded in the horizontal direction following the ascending order of the byte location numbers. On each block of this recording region, the DC components and the variable-length encoded AC components are recorded in a DC area and an AC area, respectively, with a fixed length.

In the second example, the encoded data is supplied from the buffer 13 to the representative component extractor 14 in the above-described recording order. Thus, the representative component extractor 14 can extract the DC components of an input bit stream only by counting the bit number of the bit stream in the same way as the operation described in the first example.

Figure 7:
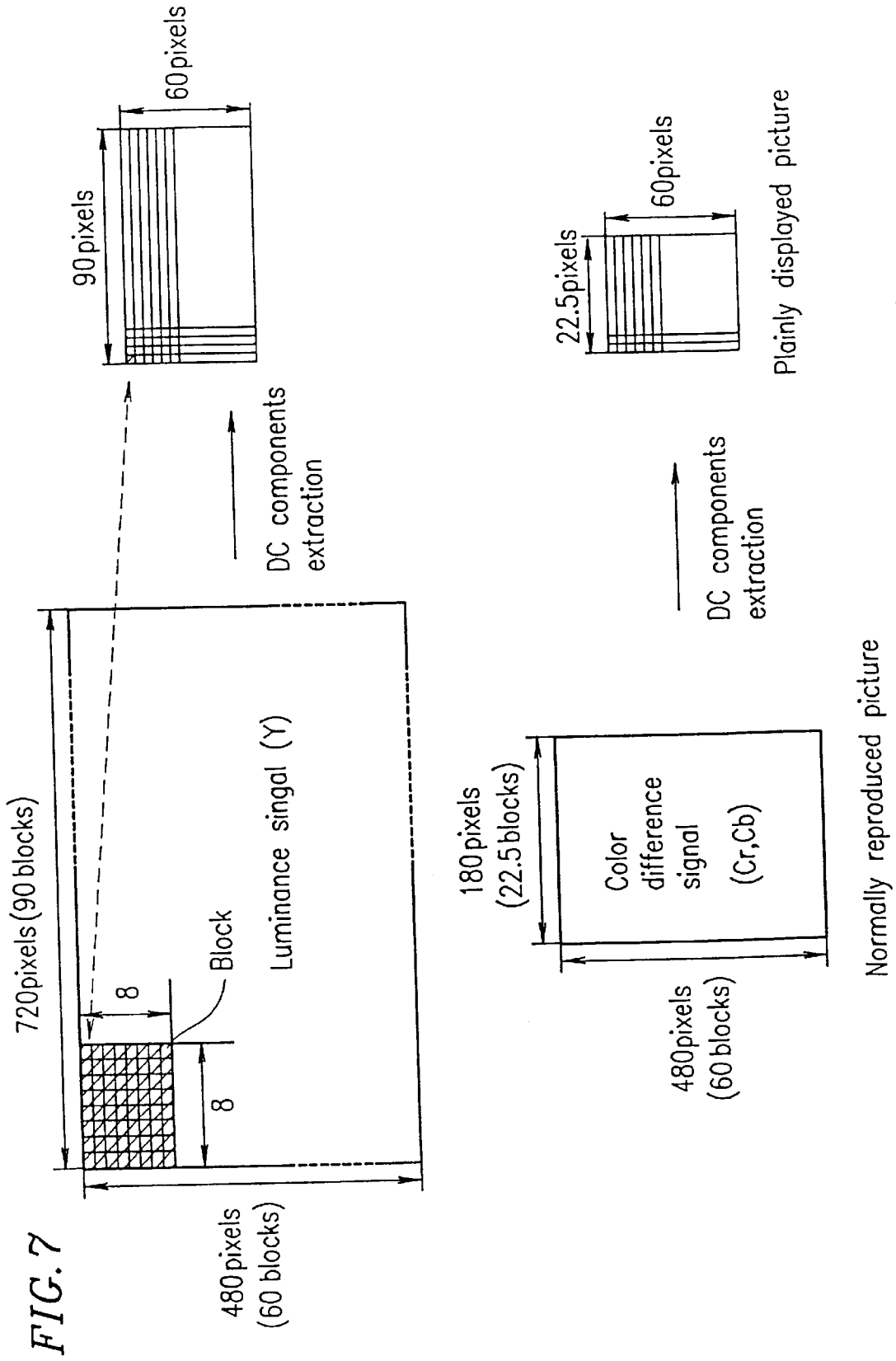
FIG. 7 is a diagram illustrating a relationship between the pixels in a normally reproduced picture obtained by decoding representative components and non-representative components and the pixels in a plainly displayed picture to be displayed on a display output terminal of this invention.

FIG. 7 is a diagram illustrating a relationship between the pixels in a normally reproduced picture obtained by decoding representative components (or DC components) and non-representative components (or AC components) and the pixels in a plainly displayed picture to be displayed by the display output terminal 19 in the second example. When one block is composed of 8×8 pixels, one 8×8 block of a normally reproduced picture corresponds to one pixel of a plainly reproduced picture. Therefore, when the size of a normally reproduced picture is represented as 720×480 pixels, the size of a plainly reproduced picture is represented as 90×60 pixels.

As described above, in the second example of the present invention, a plainly reproduced picture having a smaller size than that of a normally reproduced picture can be formed by extracting only the DC components from a fixed region on the magnetic tape. In addition, the size of a circuit applicable as the representative component extractor may be small.

It is to be noted that the size of a plainly reproduced picture is not limited to 90×60 pixels. Depending upon the necessity, the size may be increased or decreased. In addition, even when various visual disturbances such as a ringing are caused in the plainly reproduced picture, such visual disturbances can be removed by the use of an appropriate filter, for example.

It is also to be noted that the size (or the recording capacity) of the recording region is not particularly limited so long as the DC area and the AC area in each block have a fixed length.

EXAMPLE 3

Figure 8:
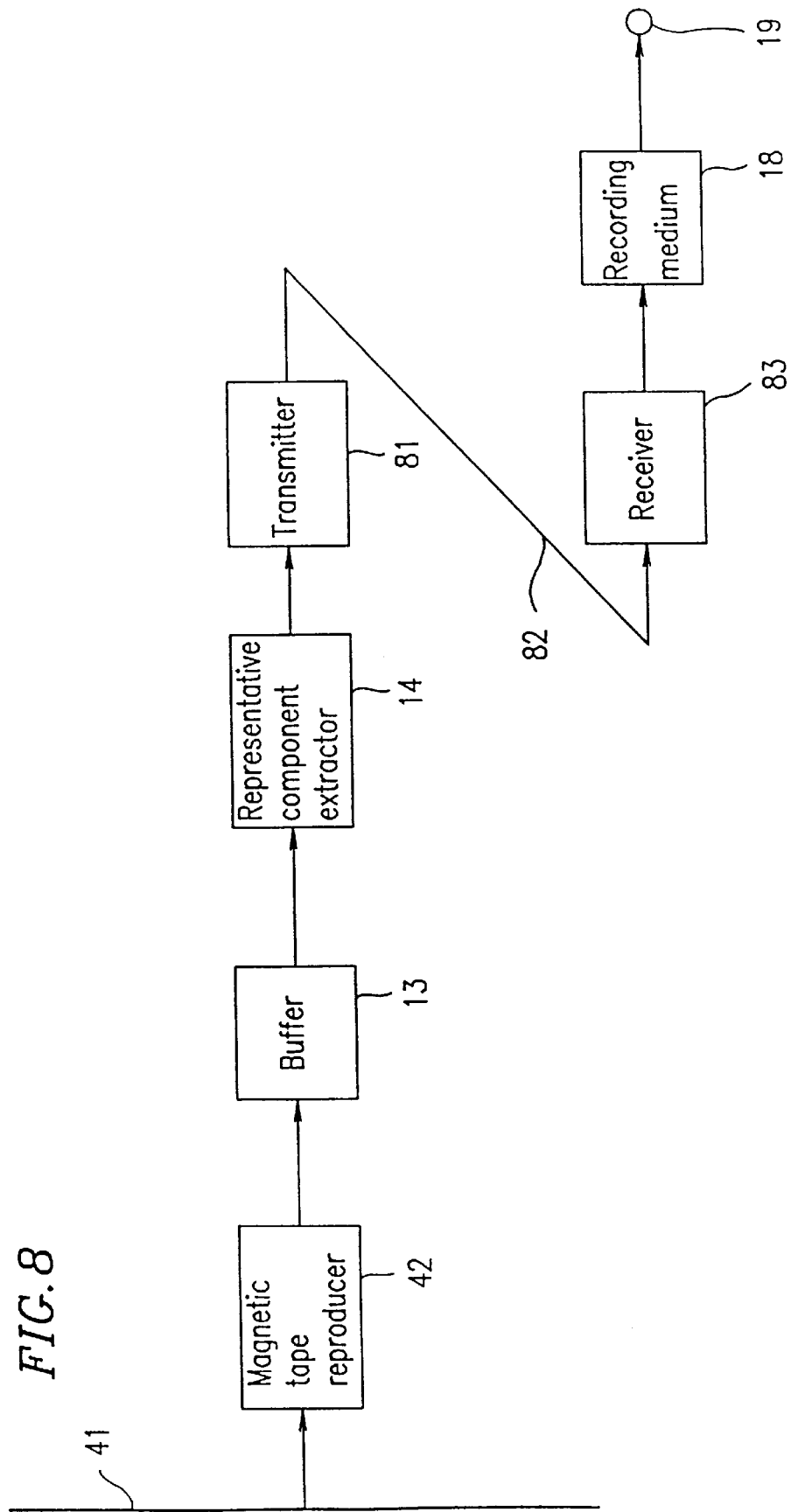
FIG. 8 is a block diagram for a video signal processing apparatus in a third example of the present invention.

FIG. 8 is a block diagram for a video signal processing apparatus in a third example of the present invention. In FIG. 8, the reference numeral 81 denotes a transmitter; 82 denotes an external transmission line; and 83 denotes a receiver.

Hereinafter, the operation in the third example will be described mainly as to the points which are different from those in the second example.

The DC components which have been extracted by the representative component extractor 14 are subjected by the transmitter 81 to encoding, packet division and the like for transmission and then transmitted through the external transmission line 82. The transmitted data is restored by the receiver 83 so as to be recorded onto the recording medium 18.

As described above, in the third example of the present invention, by encoding only the extracted DC components through a transmission line, the amount of information to be transmitted can be reduced without damaging the contents of a video signal.

EXAMPLE 4

Figure 9:
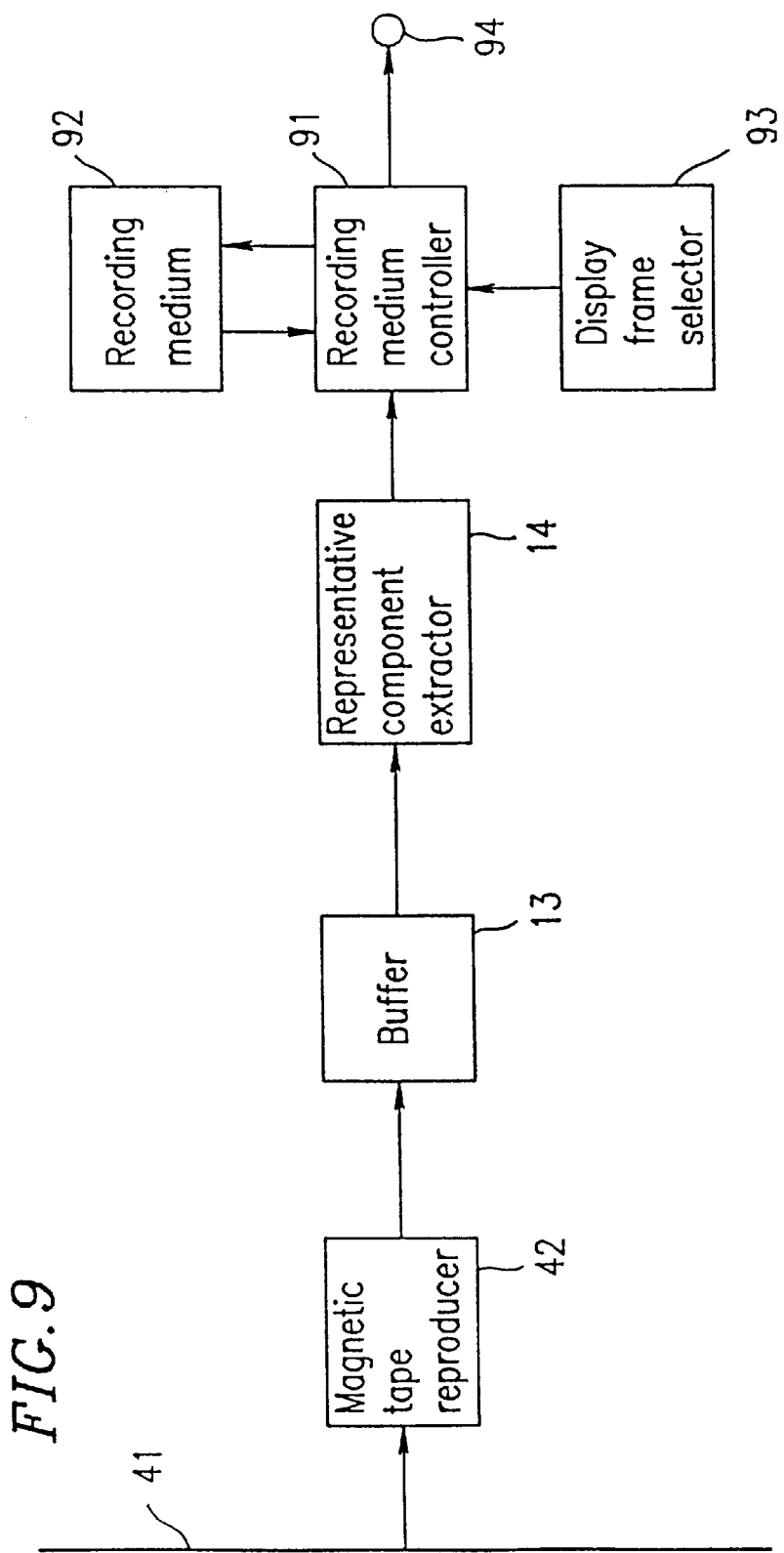
FIG. 9 is a block diagram for a video signal processing apparatus in a fourth example of the present invention.

FIG. 9 is a block diagram for a video signal processing apparatus in a fourth example of the present invention. In FIG. 9, the reference numeral 91 denotes a recording medium controller; 92 denotes a recording medium; 93 denotes a display frame selector; and 94 denotes a terminal for displaying and outputting a plurality of images.

Hereinafter, the operation in the fourth example will be described mainly as to the points which are different from those in the second example.

In accordance with the input from a user, the display frame selector 93 generates data designating the frames to be output and then outputs the data to the recording medium controller 91. The recording medium controller 91 controls the recording medium 92 such that the data in the representative components (or DC components) corresponding to the designated frames is selected and retrieved therefrom. As the recording medium 92, a random access memory (RAM), a hard disk drive (HDD), an optical disk, a magnetic tape or the like can be used. The data in the representative components corresponding to the frames designated by the display frame selector 93 is output from the recording medium 92 to the terminal 94 for displaying and outputting a plurality of images via the recording medium controller 91. The terminal 94 for displaying and outputting a plurality of images outputs a signal for simultaneously displaying a plurality of plainly reproduced pictures corresponding to the selected frames on one screen, for example.

As described above, in the fourth example of the present invention, by simultaneously displaying a plurality of plainly reproduced pictures on one screen, an editing point or a characteristic video such as a scene change video, in particular, can be searched for easily. As described in the second example, since a plainly reproduced picture has a size one-eighth as large as that of a normally reproduced picture both in the horizontal direction and in the vertical direction unless enlargement or downsizing is performed, a maximum number of frames corresponding to the plainly reproduced pictures which can be simultaneously displayed on one screen becomes 64. Moreover, if a monitor having a high resolution of about 1280×1024 pixels is used, an even larger number of plainly reproduced pictures can be displayed simultaneously.

In the fourth example, a case where the DC components are directly supplied from the representative component extractor 14 to the recording medium 92 has been described. However, it is to be noted that a configuration in which the DC components are transmitted through an external transmission line as is done in the third example may also be used.

EXAMPLE 5

Figure 10:
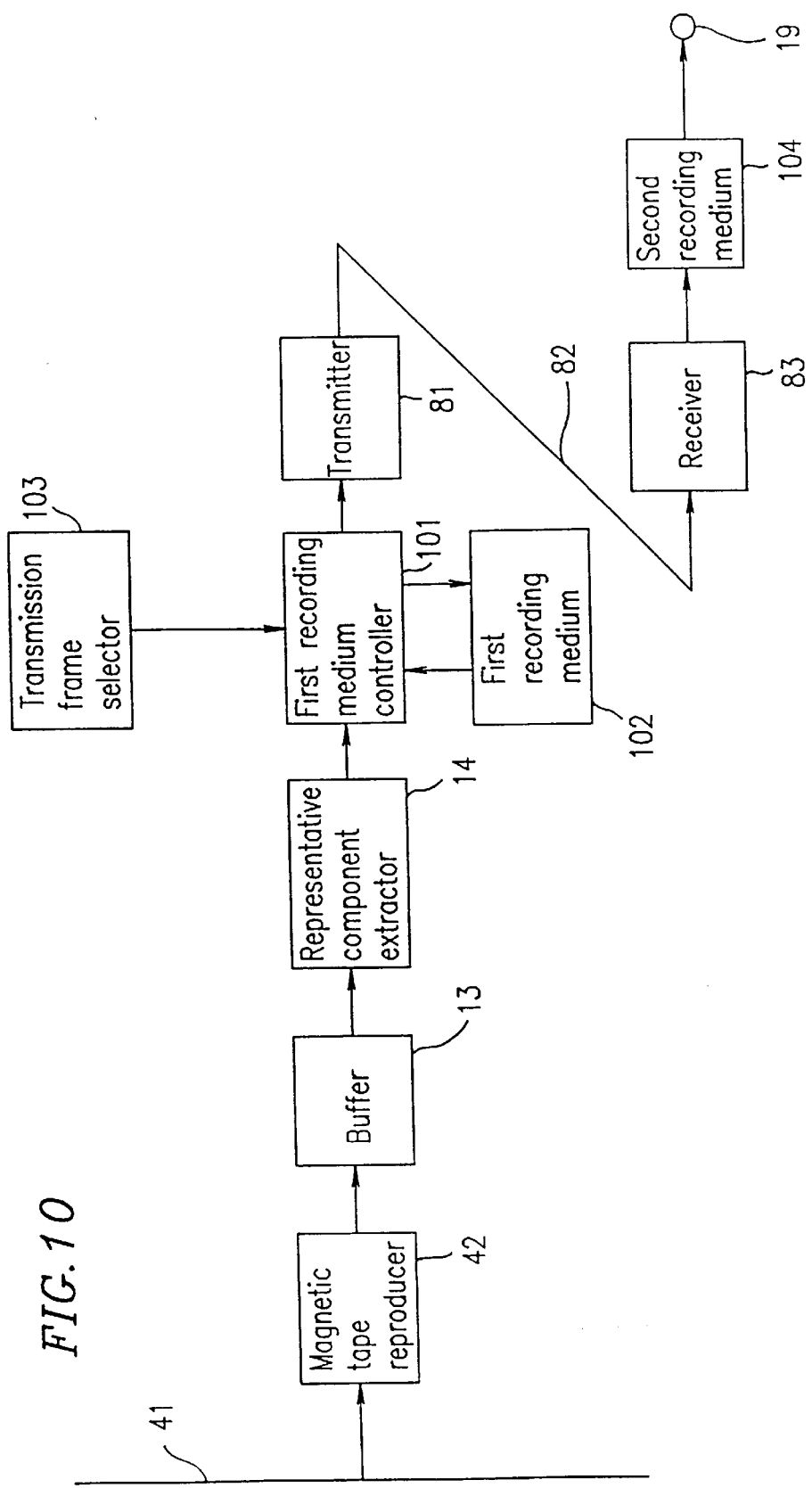
FIG. 10 is a block diagram for a video signal processing apparatus in a fifth example of the present invention.

FIG. 10 is a block diagram for a video signal processing apparatus in a fifth example of the present invention. In FIG. 10, the reference numeral 101 denotes a first recording medium,controller; 102 denotes a first recording medium; 103 denotes a transmission frame selector; and 104 denotes a second recording medium.

Hereinafter, the operation in the fifth example will be described mainly as to the points which are different from those in the third example.

The DC components extracted by the representative component extractor 14 are held in the first recording medium 102 via the first recording medium controller 101. The transmission frame selector 103 operates so that a user can arbitrarily select transmission frames from the data held in the first recording medium 102. The DC components of the frames selected by the transmission frame selector 103 are encoded by the transmitter 81 for transmission and then transmitted through the external transmission line 82. The DC component data received by the receiver 83 is temporarily held in the second recording medium 104 and then displayed by the display output terminal 19.

As described above, in the fifth example of the present invention, by arbitrarily selecting or discarding the frames to be transmitted, the amount of information to be transmitted can be considerably reduced, so that a video can be transmitted even through a transmission line having a low transmission rate (e.g., a telephone line) without damaging the contents of the video.

It is noted that a configuration, in which the DC components which have been transmitted after the frames to be transmitted were selected,beforehand by the transmission frame selector 103 are further selectively recorded or displayed on the receiving side, can also be used in this example.

EXAMPLE 6

Figure 11:
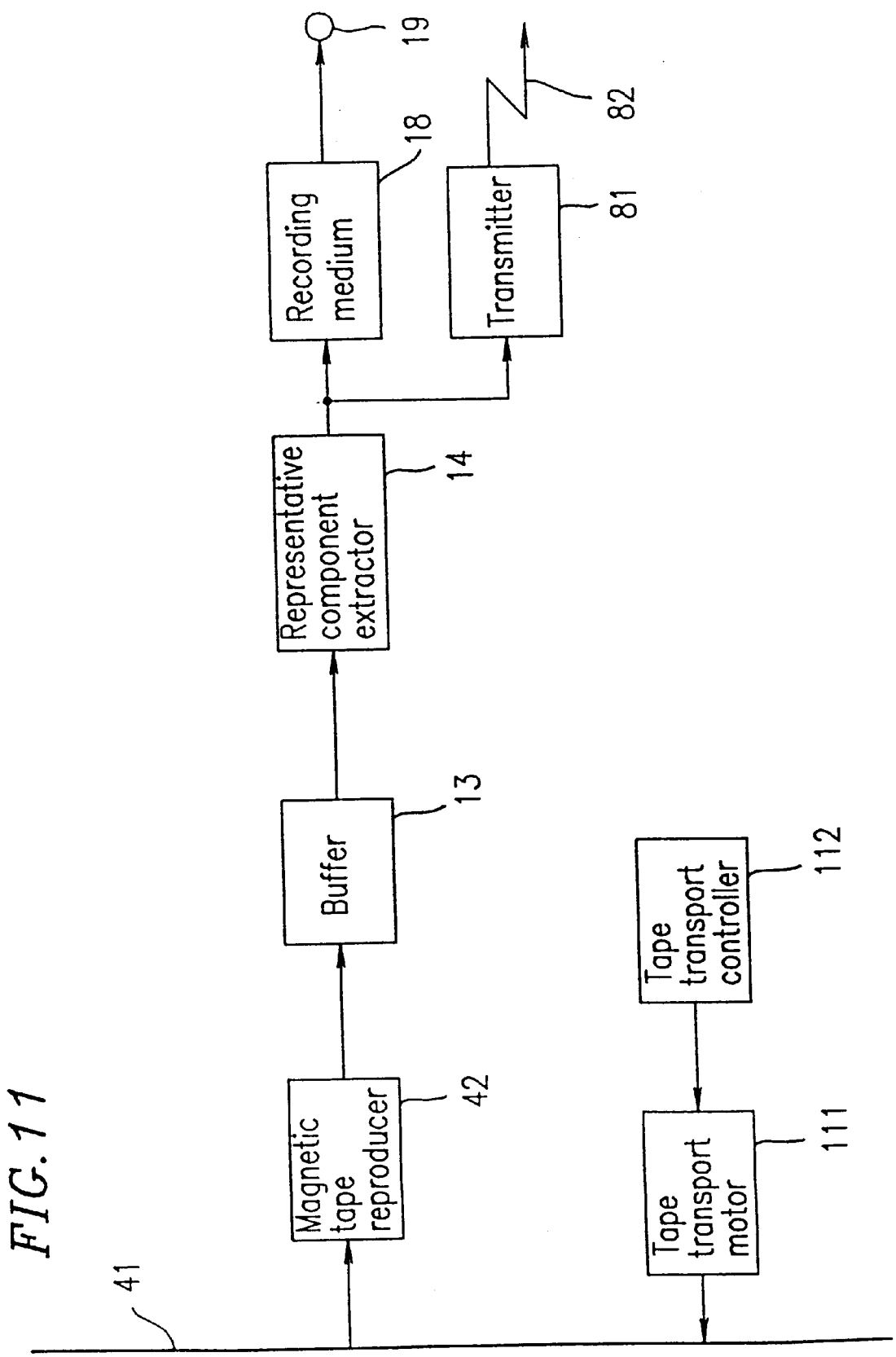
FIG. 11 is a block diagram for a video signal processing apparatus in a sixth example of the present invention.

FIG. 11 is a block diagram for a video signal processing apparatus in a sixth example of the present invention. In FIG. 11, the reference numeral 111 denotes a tape transport motor; and 112 denotes a tape transport controller.

Hereinafter, the operation in the sixth example will be described mainly as to the points which are different from those in the second example.

The tape transport motor 111 controls the running speed of the magnetic tape 41 in accordance with a control signal supplied from the tape transport controller 112.

An example of a high-speed reproducing operation where the running speed of the magnetic tape 41 is higher than a normal reproducing speed will be described principally with respect to the operation of a reproducing head.

Figure 12:
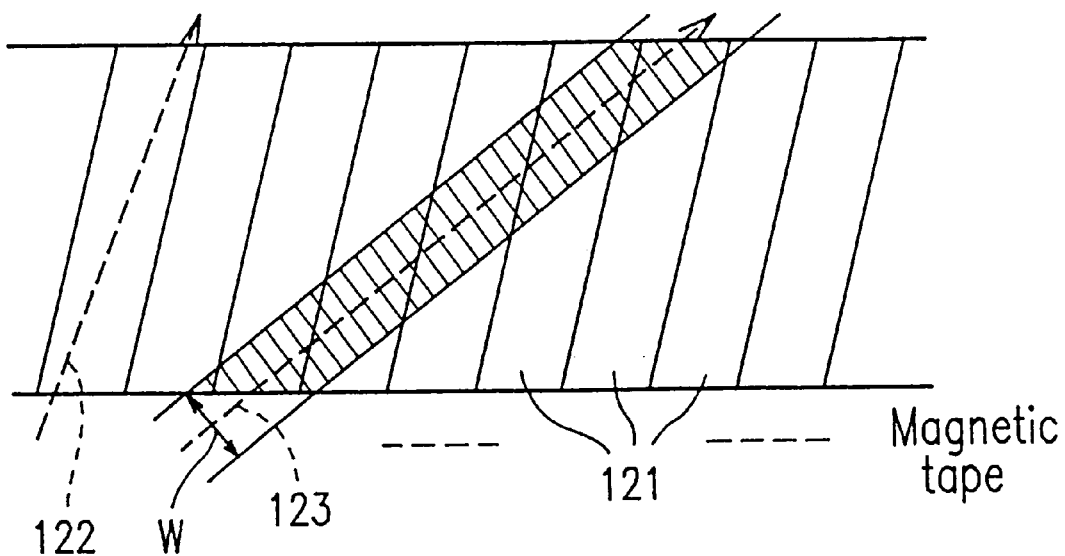
FIG. 12 is a diagram relatively showing the tracks on a magnetic tape, the traces of the center of a reproducing head at a normal reproducing speed and the traces of the center of the reproducing head at a high reproducing speed.

FIG. 12 is a diagram relatively showing the tracks 121 on a magnetic tape, the traces 122 of the center of the reproducing head at a normal reproducing speed and the traces 123 of the center of the reproducing head at a high reproducing speed. In FIG. 12, "W" indicates the width of the head. In performing a reproducing operation at a normal speed, the reproducing head scans every track, thereby reading out all the macro-blocks. On the other hand, in performing a high-speed reproducing operation, data is simultaneously read out from a plurality of tracks (hatched portion in FIG. 12) by every single scan of the reproducing head. In the same way as in the second example, only the DC components are extracted from each of the macroblocks which are read out at this time. The extracted DC components are recorded onto the recording medium 18 and then output by the display output terminal 19. Herein, a "high-speed" means a speed faster than a normal reproducing speed.

As described above, in the sixth example of the present invention, by extracting the DC components from the video data which is read out when the magnetic tape is made to run at a speed faster than a normal reproducing speed, it is possible to recognize the contents of a video signal, which has been recorded over a long period of time, at a higher speed and to reduce the amount of information of the recorded video to such a degree as the recorded video does not become unrecognizable.

Moreover, in the sixth example, the output of the buffer 13 may be input to the transmitter 81. In such a case, in order to obtain the representative components from the video signal transmitted through the external transmission line 82, it is only necessary to provide another representative component extractor 14 on the receiving side.

EXAMPLE 7

Figure 13:
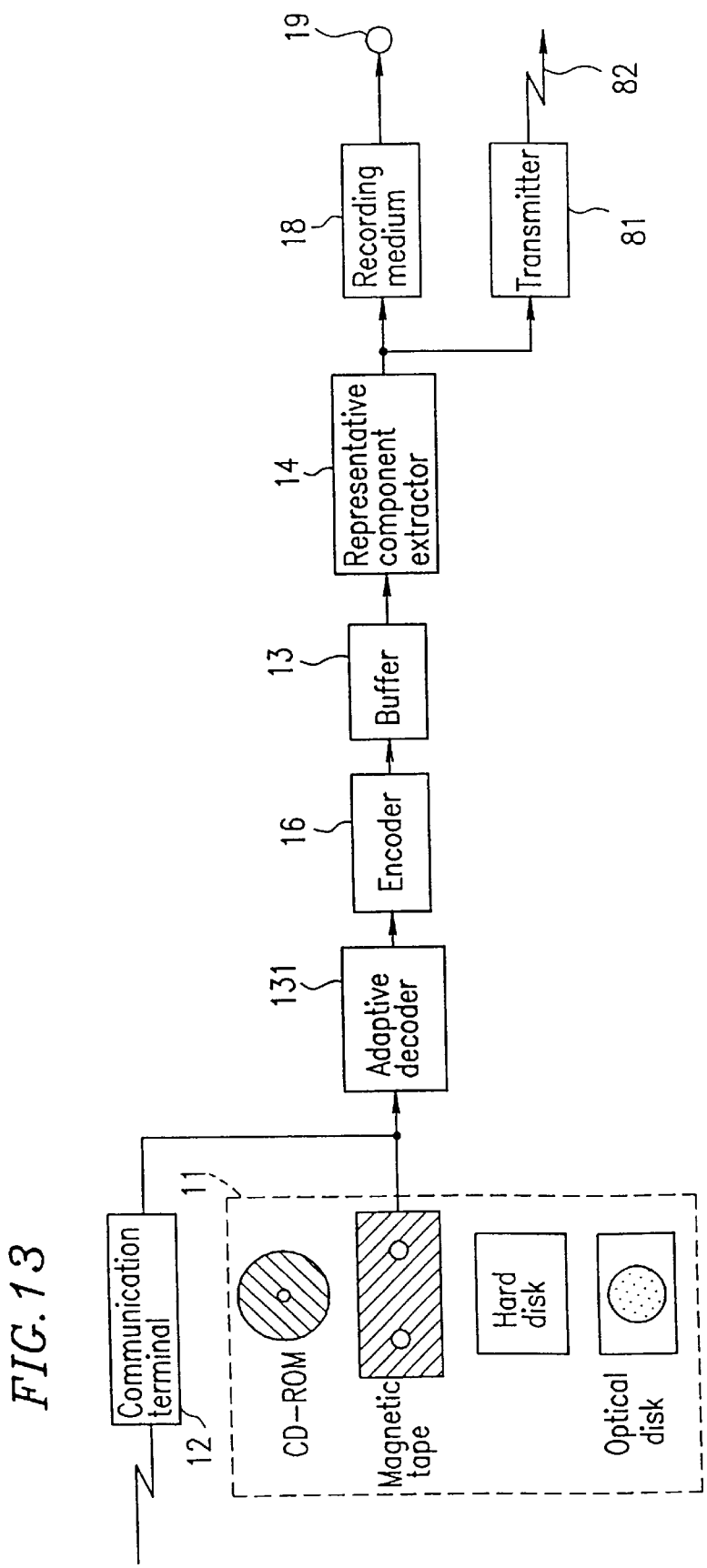
FIG. 13 is a block diagram for a video signal processing apparatus in a seventh example of the present invention.

FIG. 13 is a block diagram for a video signal processing apparatus in a seventh example of the present invention. In FIG. 13, the reference numeral 131 denotes an adaptive decoder. Hereinafter, the operation in the seventh example will be described.

The seventh example is different from the first example in that an arbitrary format may be used for encoding video data on the storage medium 11 or video data to be received through the communication terminal 12. The arbitrarily encoded data is supplied to the adaptive decoder 131, where the encoded data is decoded in accordance with the respective formats. That is to say, the "adaptive" decoder decodes an input video signal by a decoding method corresponding to the encoding method of the input video signal.

The decoded data is separated by the encoder 16 into representative components and non-representative components so as to be further encoded. The encoding is performed, for example, by an intra-frame compression using a discrete cosine transform.

The encoded data is once held in the buffer 13, and then supplied to the representative component extractor 14, where a representative video is extracted therefrom. The extracted representative video is recorded onto the recording medium 18 and then displayed by the display output terminal 19 or subjected by the transmitter 81 to an encoding suitable for transmission so as to be transmitted through the external transmission line 82. Alternatively, the video can be recorded onto the recording medium 16 and transmitted through the external transmission line 82 simultaneously.

As described above, in the seventh example of the present invention, by retrieving representative components from a video signal which has been encoded in an arbitrary format and then displaying, recording or transmitting the representative components, a video signal in any encoding format can be easily displayed and the amount of information to be recorded or transmitted can be reduced.

EXAMPLE 8

Figure 14:
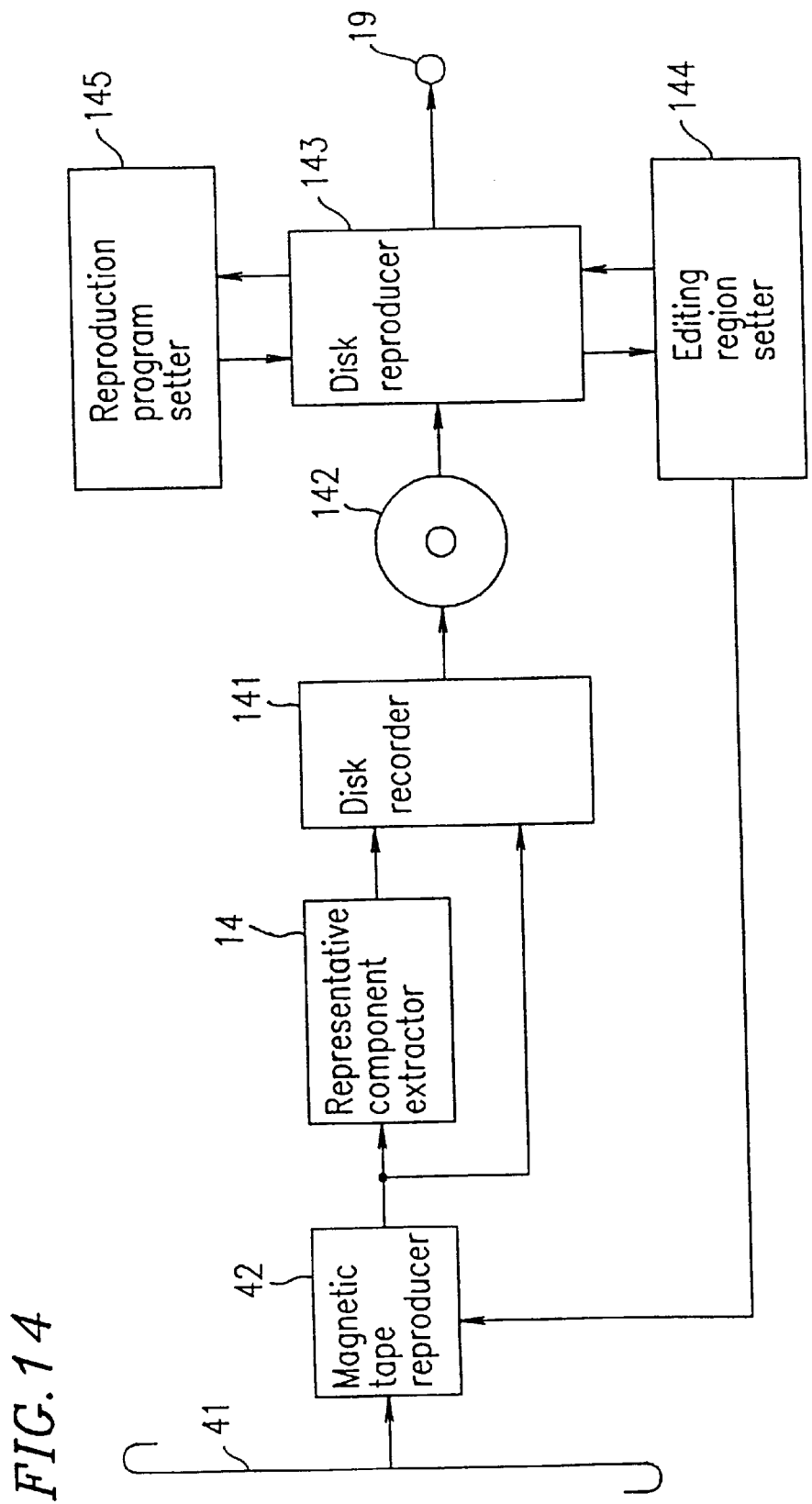
FIG. 14 is a block diagram for a video signal processing apparatus in an eighth example of the present invention.

FIG. 14 is a block diagram for a video signal processing apparatus in an eighth example of the present invention. In FIG. 14, the reference numeral 141 denotes a disk recorder; 142 denotes a magnetic disk; 143 denotes a disk reproducer; 144 denotes an editing region setter; and 145 denotes a reproduction program setter.

A video signal which has been separated into DC components and AC components is reproduced by the magnetic tape reproducer 42 from the data recorded on the magnetic tape 41. The representative component extractor 14 extracts the DC components from the video signal reproduced by the magnetic tape reproducer 42. The extracted DC components are recorded by the disk recorder 141 onto the magnetic disk 142. At this time, the time codes which have generally been recorded on the magnetic tape 41 are simultaneously recorded onto the magnetic disk 142. The DC components recorded onto the magnetic disk 142 can be reproduced by the disk reproducer 143, so that a plainly reproduced image is displayed onto the display output terminal 19.

Next, by making the editing region setter 144 operate the disk reproducer 143, a list of times codes corresponding to the necessary cuts is produced from the video signal recorded on the magnetic disk 142 (at this point of time, it is the DC components of the video signal recorded on the magnetic tape 141 that have actually been recorded on the magnetic disk 142). More specifically, by turning a dial or the like attached to the editing region setter 144 to make the disk reproducer 143 perform various operations Such as fast-forward, rewind and variable speed reproducing operations, necessary cuts are searched for, while watching the images which are composed of DC components and displayed on the display output terminal 19. Then, the time code start points and the time code end points of the necessary cuts thus found are sequentially registered. In this case, the time code start point and the time code end point are set so as to sufficiently include each of the necessary cuts and to flexibly change the editing points during the decisive editing operation to be performed later. That is to say, the editing region setter 144 outputs a control signal for performing a rough editing operation using the representative components to the magnetic tape reproducer 42. Such a rough editing operation means that editing is roughly performed on the order of seconds. A time code or the like is used as the control signal output from the editing region setter 144. In accordance with these time codes, the magnetic tape reproducer 42 performs drive controls including the rewind and the fast forward of the tape.

Next, the list of time codes corresponding to the necessary cuts produced by the editing region setter 144 is transferred to the magnetic tape reproducer 42. The magnetic tape reproducer 42 reproduces again the video signal which is composed of DC components and AC components and has been recorded in a region on the magnetic tape 41 so as to correspond to the time code list designated by the editing region setter 144. Both the DC components and the AC components of the video signal reproduced by the magnetic tape reproducer 42 are recorded by the disk recorder 141 onto the magnetic disk 142 this time.

In recording the video signal onto the magnetic disk 142, since the DC components have already been recorded thereon, only the AC components of the necessary portions may be recorded.

Herein, the video signal recorded onto the magnetic disk 142 is reproduced by the disk reproducer 143 and then subjected to processing required for reproduction such as an inverse DCT, so that the video signal is restored into a high-quality image before the DCT and the image can be displayed onto the display output terminal 19.

Next, the video signal materials which have been recorded on the magnetic tape 41 are subjected by the reproduction program tatter 145 to the final decisive editing operation. That is to say, while displaying high-quality images from the video signals (both the DC components and the AC components have been recorded this time) which have been recorded onto the magnetic disk 142 and correspond to the necessary cuts selected by the editing region setter 144, minute editing points are set. In other words, the reproduction program setter 145 outputs a control signal for performing a fine editing operation on a frame basis to the disk reproducer 143. Also, with respect to appropriate cuts, a trick play reproduction is designated or the reproduction order of a group of cuts is set. In accordance with the reproduction program produced in this manner, the disk reproducer 143 finally reproduces the video signals recorded on the magnetic disk 142. These reproduced signals may be on air as video signals for broadcasting or recorded again onto a recording medium such as a magnetic tape.

EXAMPLE 9

Figure 15:
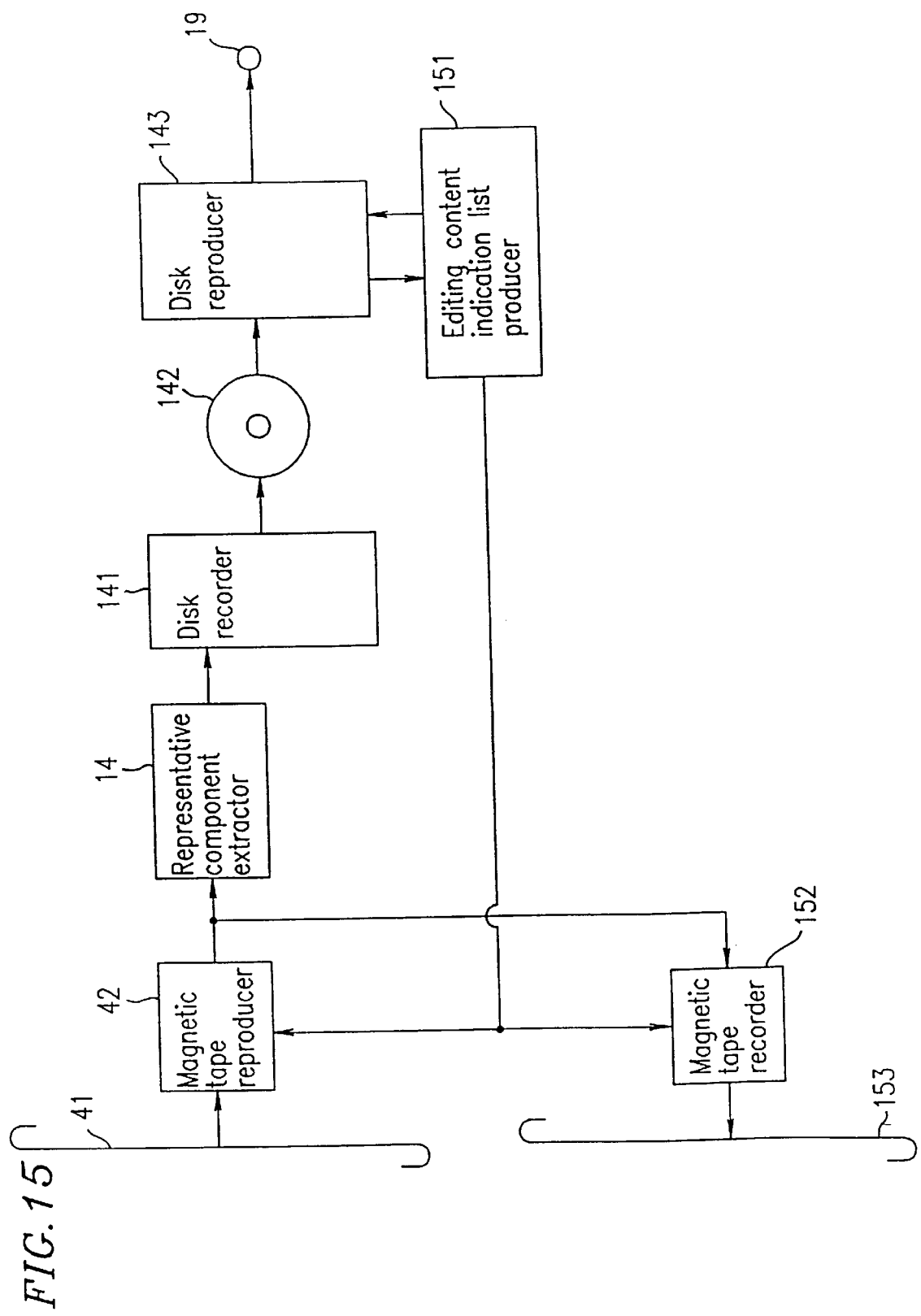
FIG. 15 is a block diagram for a video signal processing apparatus in a ninth example of the present invention.

FIG. 15 is a block diagram for a video signal processing apparatus in a ninth example of the present invention. In FIG. 15, the reference numeral 151 denotes an editing content indication list producer; 152 denotes a magnetic tape recorder; and 153 denotes a magnetic tape.

Hereinafter, the ninth example of the present invention will be described with reference to the drawings.

First, the magnetic tape reproducer 42 reproduces a video signal, which has been separated into DC components and AC components, from the magnetic tape 41. The representative component extractor 14 extracts the DC components from the video signal reproduced by the magnetic tape reproducer 42. The extracted DC components are recorded by the disk recorder 141 onto the magnetic disk 142. At this time, the time codes which have generally been recorded on the magnetic tape 41 are simultaneously recorded onto the magnetic disk 142. The DC components recorded onto the magnetic disk 142 can be reproduced by the disk reproducer 143, so that a plainly reproduced image composed of DC components only is displayed onto the display output terminal 19.

Next, by making the editing content indication list producer 151 operate the disk reproducer 143, a list of times codes corresponding to the necessary cuts is produced from the video signal recorded on the magnetic disk 142 (at this point in time, it is the DC components of the video signal which were recorded on the magnetic tape 41 that are actually recorded on the magnetic disk 142). More specifically, by turning a dial or the like attached to the editing content indication list producer 151 to make the disk reproducer 143 perform various operations such as fast-forward, rewind and variable speed reproducing operations, necessary cuts are searched for, while watching the images which are composed of DC components and displayed on the display output terminal 19. Then, the time code start points and the time code end points of the necessary cuts thus found are sequentially registered. Also, information indicating appropriate reproducing speeds for the selected outs is registered. Furthermore, information indicating the reproduction order of the selected group of cuts is registered.

Next, the list of time codes corresponding to the necessary cuts which has been produced by the editing content indication list producer 151, the information indicating appropriate reproducing speeds for the respective outs and the information indicating the reproduction order of the respective cuts are transferred to the magnetic tape reproducer 42 and the magnetic tape recorder 152. The magnetic tape reproducer 42 reproduces again the video signal which is composed of DC components and AC components and has been recorded in a region on the magnetic tape 41 in accordance with the contents indicated by the editing content indication list producer 151. Both the DC components and the AC components of the video signal reproduced by the magnetic tape reproducer 42 are sequentially assemble-recorded by the magnetic tape recorder 152 onto the magnetic tape 153 this time. A signal reproduced by inserting the video signal recorded onto the magnetic: tape 153 into another reproducer may be on air as a video signal for broadcasting. Additionally, by repeating the above-described operations by inserting the video signal into the magnetic tape reproducer 42, a further detailed editing operation may be performed.

In the eighth and the ninth examples, in an operation mode in which the DC components extracted by the representative component extractor 14 from the signal reproduced by the magnetic tape reproducer 42 are recorded onto the magnetic disk 142, if the magnetic tape reproducer 42 is made,to reproduce the signal at a rate higher than a normal rate (in a trick-play reproducing mode), then the image information included on one screen for every frame frequency covers a plurality of frames but the transfer execution time can be shortened. In this case, if the reproducing rate of the magnetic tape reproducer 42 is set to be 5 to 10 times as high as a normal rate, an image quality high enough to make the contents recognizable can be obtained in the case of ordinary video signal materials. In the case of reproducing a signal from the magnetic disk 142, by reproducing the signal more slowly by the ratio of the reproducing rate of the magnetic tape reproducer 42 to the recording rate onto the magnetic disk 142, an original reproducing rate can be recovered.

As described above, in the eighth and the ninth examples of the present invention, the video signal processing apparatus is configured such that the representative component extractor extracts the representative components from a video signal which has been separated into representative components and non-representative components other than the representative components and that an image monitor display can be performed on an image display unit (or a display output terminal) by using these representative components only. Thus, by using a signal, obtained by compressing a signal conformable to a studio standard in accordance with a discrete cosine transform (DCT), as the video signal in such a format and using the DC components obtained by the DCT as the representative components, the data rate of the representative components can be reduced to a very low level and the recording capacity of the second recording medium may be small.

In the case of using a magnetic disk as the second recording medium, since all the video signal materials, which have been recorded on a magnetic tape widely and generally used as a first recording medium, cannot be transferred onto the magnetic disk all at once, in view of the cost and recording capacity problems of a magnetic disk, it becomes almost always necessary to perform work for selecting beforehand the materials on the magnetic tape to be used. The work is ordinarily performed by operating a VTR which can reproduce a magnetic tape. However, since a magnetic tape is a sequential recording medium, such a recording medium has a poor operation response speed and it take an enormous amount of time to perform such work. On the other hand, according to the present invention, since such time-consuming work can be performed on a magnetic disk having excellent accessibility, the time required for the work can be considerably reduced.

In addition, since only the representative components are extracted by a representative component extractor, it is not necessary to separately provide an expensive video compressor/expander.

Furthermore, in the first operation mode in which the representative components of a video signal recorded on the first recording medium are extracted so as to be recorded onto the second recording medium, by making the first reproducer reproduce the signal at a reproducing rate higher than a normal reproducing rate, the time required for a series of editing works can be further shortened.

EXAMPLE 10

Figure 16:
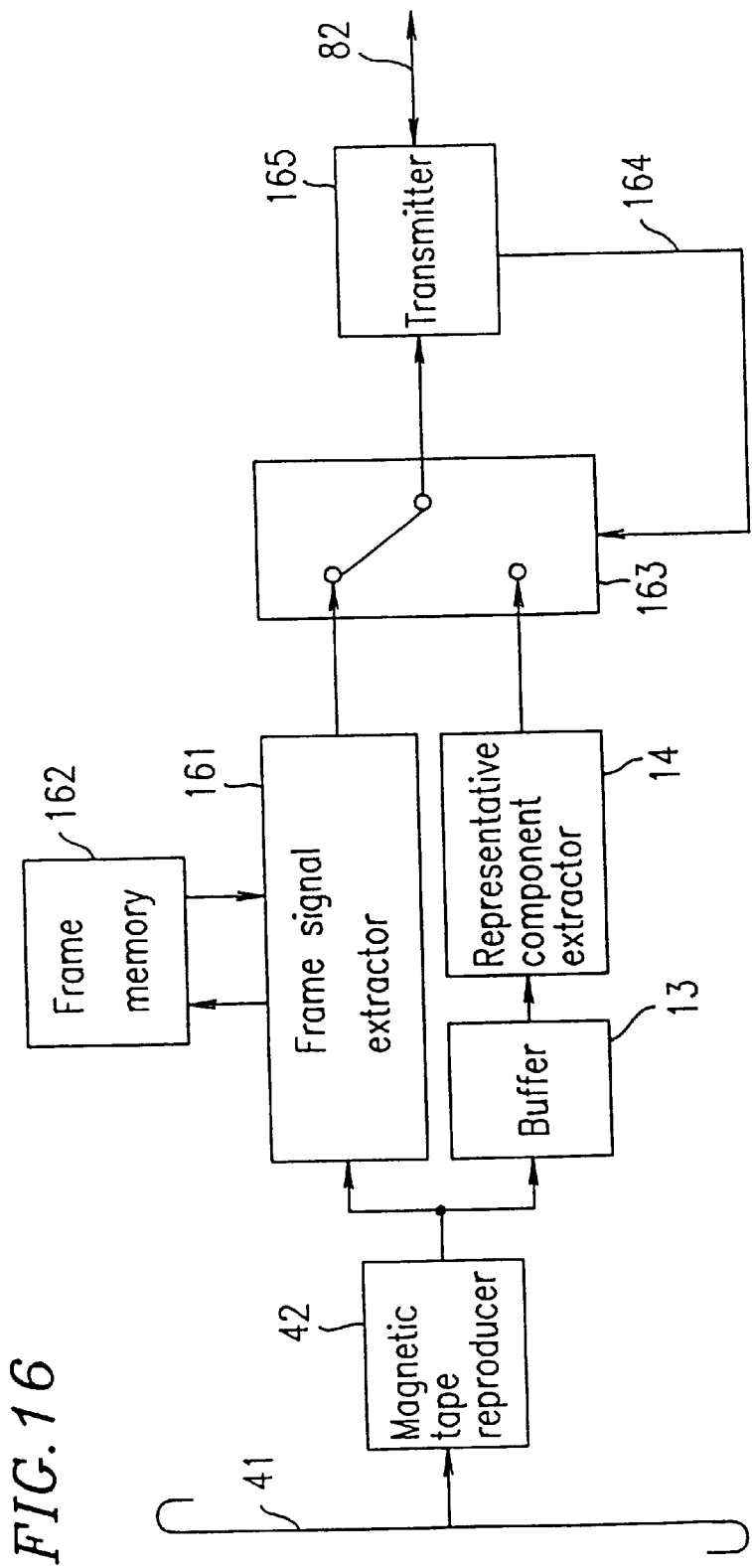
FIG. 16 is a block diagram for a video signal processing apparatus on a transmission side in a tenth example of the present invention.
Figure 17:
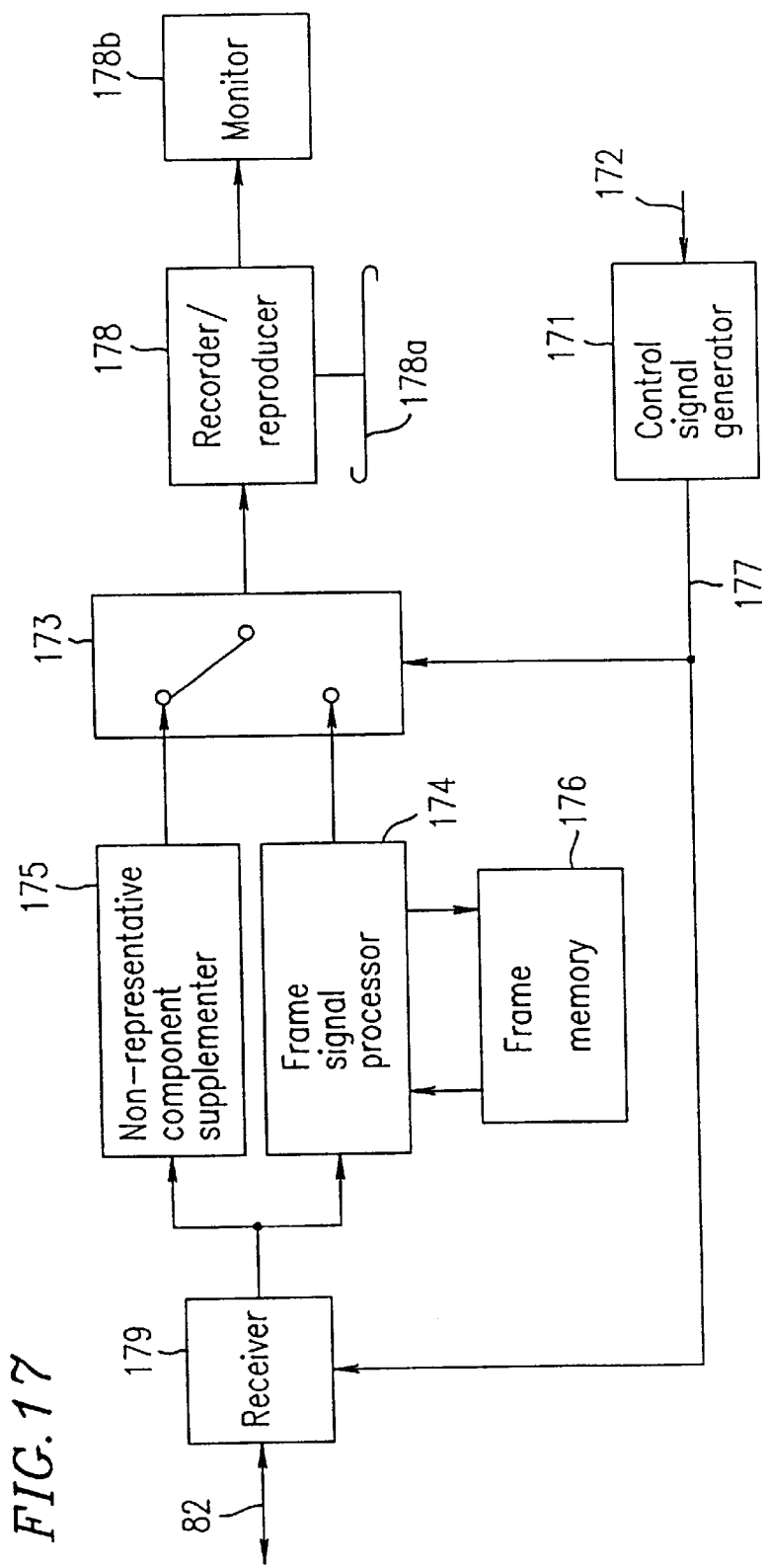
FIG. 17 is a block diagram for a video signal processing apparatus on a receiving side in the tenth example of the present invention.

FIG. 16 is a block diagram for a video signal processing apparatus on a transmission side in a tenth example of the present invention. FIG. 17 is a block diagram for a video signal processing apparatus on a receiving side in the tenth example of the present invention. In FIG. 16, the reference numeral 161 denotes a frame signal extractor; 162 denotes a frame memory; 163 denotes a first selector; 164 denotes a control signal; and 165 denotes a transmitter. In FIG. 17, the reference numeral 171 denotes a control signal generator; 172 denotes a selection signal; 173 denotes a second selector; 174 denotes a frame signal processor; 175 denotes a non-representative component supplementer; 176 denotes a frame memory; 177 denotes a control signal; 178 denotes a recorder/reproducer; 178a denotes a recording medium; 178b denotes a monitor; and 179 denotes a receiver.

First, the operation on the transmission side will be described with reference to FIG. 16. The magnetic tape reproducer 42 reproduces a video signal which has been separated into representative components and non-representative components other than the representative components from the magnetic tape 41. The frame signal extractor 161 extracts a frame signal or a signal corresponding to one screen from the output signal of the magnetic tape reproducer 42 and then records the frame signal onto the frame memory 162. Also, if necessary, the frame signal extractor 161 reads out the frame signal recorded in the frame memory 162 and then outputs the frame signal to the first selector 163. The frame signal extractor 161 partially decimates a plurality of frames representing a moving picture at arbitrary intervals. For example, by partially decimating the frames, the frame signal extractor 161 outputs only 2 or 3 frames per second. This decimation interval depends upon the data rate of a transmission line.

The representative component extractor 14 extracts only the representative components from the video signal in such a format, thereby outputting the representative components as a representative component signal to the first selector 163.

In accordance with the control signal 164 output from the transmitter 165, the first selector 163 selects either the frame signal or the representative component signal and then outputs the selected signal to the transmitter 165. The transmitter 165 outputs the output of the first selector 163 as a first transmission signal to the external transmission line 82. Also, the transmitter 165 receives a second transmission signal through the external transmission line 82 and then outputs the signal as the control signal 164 to the first selector 163.

Next, the operation on the receiving side will be described with reference to FIG. 17.

In accordance with the selection signal 172, the control signal generator 171 outputs the control signal 177 to the second selector 173 and the receiver 179. The receiver 179 outputs the received control signal 177 as a second transmission signal to the external transmission line 82. Also, the receiver 179 receives the first transmission signal through the external transmission line 82 and then outputs the received first transmission signal to the frame signal processor 174 if the first transmission signal is a frame signal or outputs the received first transmission signal to the non-representative component supplementer 175 if the first transmission signal is a representative component signal.

The frame signal processor 174 records the frame signal output from the receiver 179 onto the frame memory 176. Also, the frame signal processor 174 reads out the frame signal recorded on the frame memory 176 and then outputs the frame signal as a compressed video signal to the second selector 173. When the frame signal is a frame signal representing a moving picture, the frame signal is output as the compressed video signal by being decimated in a unit of a frame in accordance with the transmission data rate. On the other hand, when the frame signal is a frame signal representing a still picture, the frame signal may be repeatedly output several times as the compressed video signal.

The non-representative component supplementer 175 supplements a signal substitutional non-representative components into a representative component signal and then outputs the supplemented signal to the second selector 173. Also, the non-representative component supplementer 175 is not always required to output a supplemented signal. The non-representative component supplementer 175 operates such that the representative component signal is processed by an appropriate filter, for example.

In accordance with the control signal 177, the second selector 173 selects either the output of the frame signal processor 174 or the output of the non-representative component supplementer 175 and then outputs the selected output to the recorder/reproducer 178. The recorder/reproducer 178 records the selected output signal onto the recording medium 178a or outputs the selected output signal to the monitor 178b. The recording medium 178a is not limited to a tape-type medium, but can be a disk-type medium, such as a HDD.

In this case, the control signal 177 is a control signal making the second selector 173 select the output of the frame signal processor 174 when the first selector 163 selects the output of the frame signal extractor 161 and making the second selector 173 select the output of the non-representative component supplementer 175 when the first selector 163 selects the output of the representative component extractor 14.

This example has been described while assuming that the transmission side and the receiving side each have a single function. Alternatively, both the transmission side and the receiving side each may be configured to perform both of the transmission and receiving functions.

Moreover, the control signal generator 171 is provided on the receiving side in this example. Alternatively, the control signal generator 171 may be provided on the transmission side. In such case, the control signal 164 is transmitted to the selector at receiving side through the selector at the transmission side and the transmission line.

EXAMPLE 11

Figure 18:
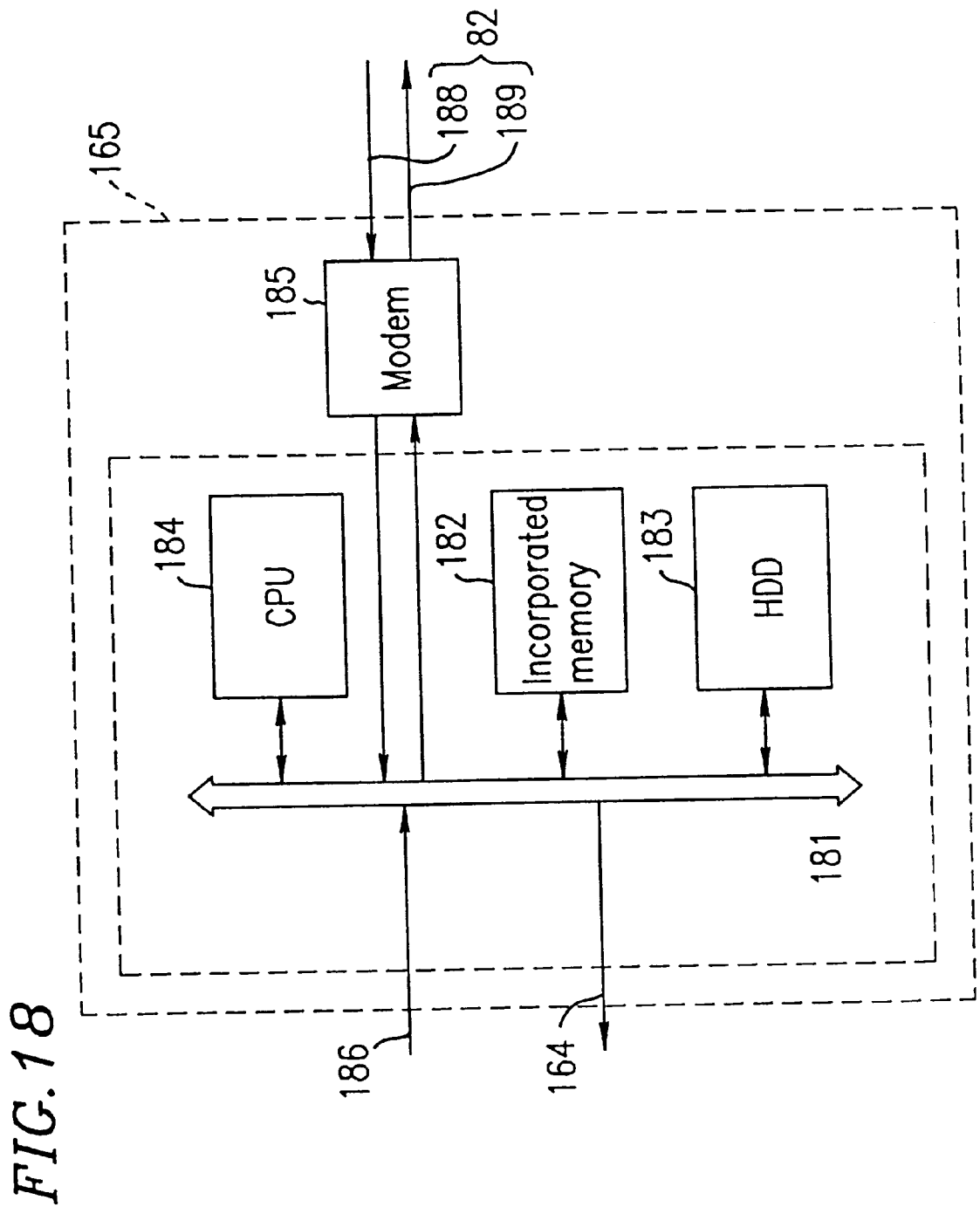
FIG. 18 is a block diagram for a video signal processing apparatus in an eleventh example of the present invention.

FIG. 18 is a block diagram for a video signal processing apparatus in an eleventh example of the present invention. It is to be noted that the eleventh example is a specific embodiment of the transmitter 165 of the tenth example. In FIG. 18, the reference numeral 181 denotes a PCI bus; 182 denotes an incorporated memory; 183 denotes a hard disk; 184 denotes a CPU; 185 denotes a modem; 186 denotes a data line extended from the first selector 163; 188 denotes a data line of the external transmission line 82; and 189 denotes a control line of the external transmission line 82.

An input signal supplied from the first selector 163 shown in FIG. 16 through the date line 186 is passed through the PCI bus 181 shown in FIG. 18 so as to be stored into the incorporated memory 182 or the hard disk 183. The CPU 184 outputs the input signal recorded in the incorporated memory 182 or in the hard disk 183 to the modem 185 and outputs the control signal 164, output from the modem 185 via the PCI bus 181, to the first selector 163. The modem 185 subjects the input signal to predetermined signal processing, thereby outputting a first transmission signal through the data line 188 and the control line 189 to the external transmission line 82. Also, the modem 185 receives the second transmission signal through the external transmission line 82 and then outputs the signal as the control signal 164 to the PCI bus 181. The operation which has not been herein described is the same as that of the tenth example.

In this example, the input signal is assumed to be recorded in the incorporated memory 182 or in the hard disk 183. However, the input signal may be recorded not only in the incorporated memory or in the hard disk but also in any other storage medium. Also, a PCI bus is assumed to be used as the bus for transmitting an input signal or the control signal 164 therethrough. Alternatively, an ISA bus may also be used. Moreover, it is assumed to be the modem 185 that outputs the first transmission signal to the external transmission line 82 and receives the second transmission signal through the external transmission line 82. However, any circuit other than the modem 185 may also be used so long as the circuit can input and output a signal through the external transmission line 82.

EXAMPLE 12

Figure 19:
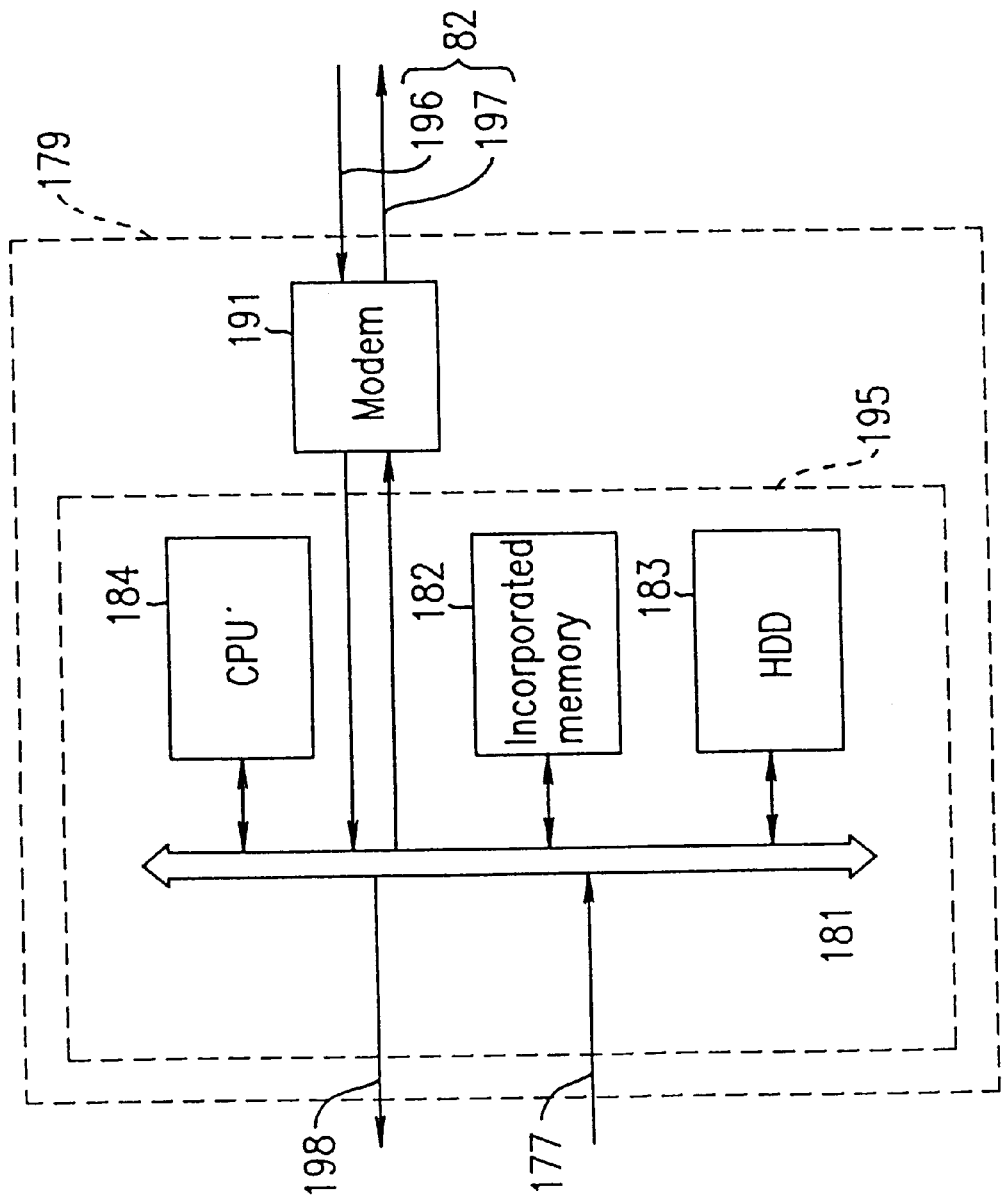
FIG. 19 is a block diagram for a video signal processing apparatus in a twelfth example of the present invention.

FIG. 19 is a block diagram for a video signal processing apparatus in a twelfth example of the present invention. It is to be noted that the twelfth example is a specific embodiment of the receiver 179 of the tenth example. In FIG. 19, the receiver 179 includes a computer 195 including a CPU 184; an incorporated memory 182; a hard disk 183; and a PCI bus 181, and a modem 191. The reference numeral 196 denotes a data line of the external transmission line 82; 197 denotes a control line of the external transmission line 82; and 198 denotes a data line extending to the non-representative component supplementer 175 and the frame signal processor 174. In this twelfth example, the entire configuration of the video signal processing apparatus is the same as that of the tenth example.

The modem 191 receives a first transmission signal through the external transmission line 82; subjects the received signal to predetermined signal processing; and then outputs the processed signal through the PCI bus 181 to the incorporated memory 182 or the hard disk 183. The modem 191 also subjects the control signal 164 to predetermined signal processing, thereby outputting the processed signal as the second transmission signal to the external transmission line 82. The CPU 184 outputs the signal recorded on the incorporated memory 182 or on the hard disk 183 through the PCI bus 181 to the frame signal processor 174 or the non-representative component supplementer 175. In this case, when the output signal of the modem 191 is a frame signal, the frame signal is output to the frame signal processor 174. On the other hand, when the output signal is a representative component signal, the representative component signal is output to the non-representative component supplementer 175. Also, the control signal 164 output from the control signal generator 171 is output through the PCI bus 181 to the modem 191. The operation which has not been herein described is the same an that of the tenth example.

In this example, the output signal of the modem 191 is assumed to be recorded in the incorporated memory 182 or in the hard disk 183. However, the output signal may be recorded not only in the incorporated memory or in the hard disk but also in any other storage medium. Also, a PCI bus is assumed to be used as the bus for transmitting the output signal of the modem 191 and the control signal 164 therethrough. Alternatively, an ISA bus may also be used. Moreover, it is assumed to be the modem 191 that outputs the second transmission signal to the external transmission line 82 and receives the first transmission signal through the external transmission line 82. However, any circuit other than the modem 191 may also be used so long as the circuit can input and output a signal through the external transmission line 82.

Figure 20:
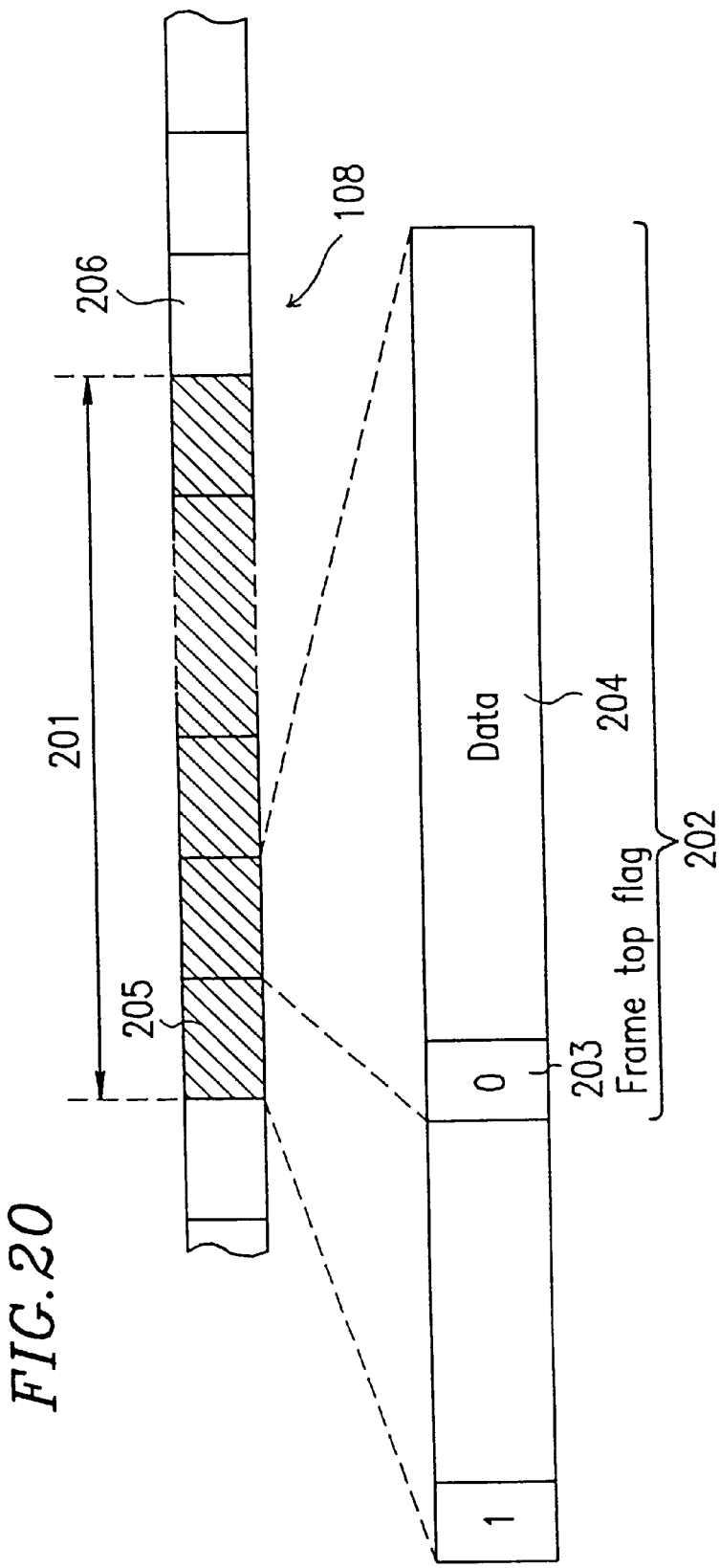
FIG. 20 is a diagram for illustrating the twelfth example of the present invention.

FIG. 20 is a diagram illustrating the twelfth example of the present invention. It is to be noted that this twelfth example is described by utilizing a specific format of the compressed video signal of the tenth example. In FIG. 20, a compressed video signal is composed of a plurality of frame signals 201. A plurality of packets 202 are set for each frame signal 201. In each packet 202, there are a region for a frame top flag 203 and a region for data 204. The first packet of the first frame will be called a first frame top packet 205 and the first packet of the second frame will be called a second frame top packet 206. The frame top flag 203 in the top packet of each frame will be called a "top" while the other frame top flags 203 in the other packets of each frame will be called "non-tops". The entire configuration of the video signal processing apparatus in the twelfth example is the same as that of the tenth example.

A compressed video signal is transmitted by dividing the signal into a plurality of packets 202. The frame signal extractor 161 shown in FIG. 16 can determine whether or not the packet exists at the top of a frame by examining the contents of the frame top flag 203. In this case, the frame signal extractor 161 recognizes the packets, ranging from the first frame top packet 205 to a packet immediately before the second frame top packet 206 appearing next to the first frame, as one frame, thereby extracting this portion as a frame signal. The operation which has not been herein described is the same as that of the tenth example.

In this example, the frame top flag 203 shown in FIG. 20 is located at the top of a packet 202. However, the frame top flag 203 may be located at any position inside the packet 202.

FIG. 21 is a diagram also illustrating the twelfth example of the present invention. It is to be noted that this twelfth example is described while assuming that the video signal of the tenth example is an interlaced signal. In the portion (a) of FIG. 21, fields 211a, 211b and 211c are fields composed of odd-numbered scanning lines, while fields 212a and 212b are fields composed of even-numbered scanning lines. In each field, the scanning lines 213 indicated by solid lines are scanning lines included in the field, while the scanning lines 214 indicated by broken lines are scanning lines not included in the field. As shown in the portion (b) of FIG. 21, odd-numbered scanning lines 216 and even-numbered scanning lines 217 are alternately arranged in one frame 215.

Figure 22:
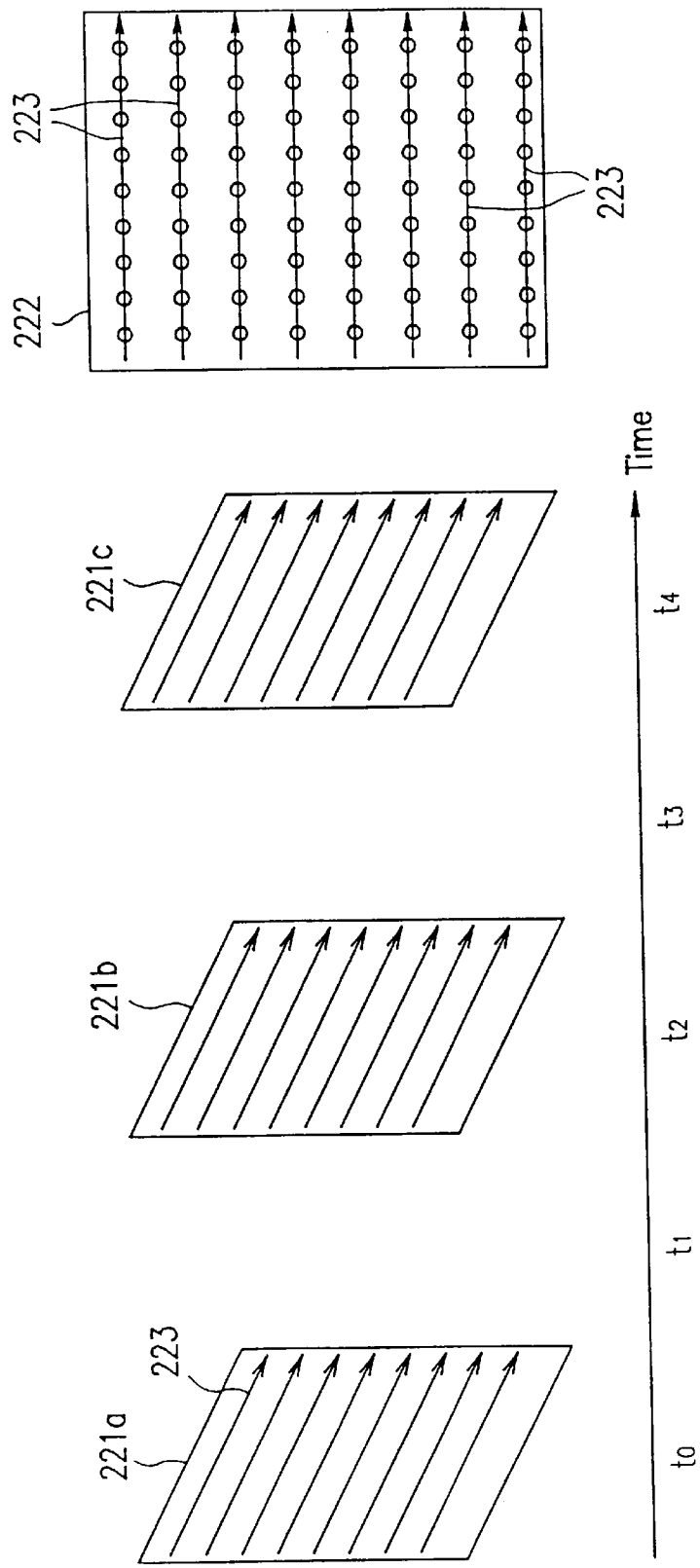
FIG. 22 is a diagram for illustrating a variation of the tenth example of the present invention.

FIG. 22 is a diagram illustrating a variation of the tenth example of the present invention. It is to be noted that the video signal of the tenth example is assumed to be an interlaced signal in FIG. 22. In the portion (a) of FIG. 22, fields 221a, 221b and 221c indicate three successive frames. As shown in the portion (b) of FIG. 22, a frame 222 is composed of a plurality of scanning lines 223 which are scanned during a single vertical scanning period.

Figure 23:
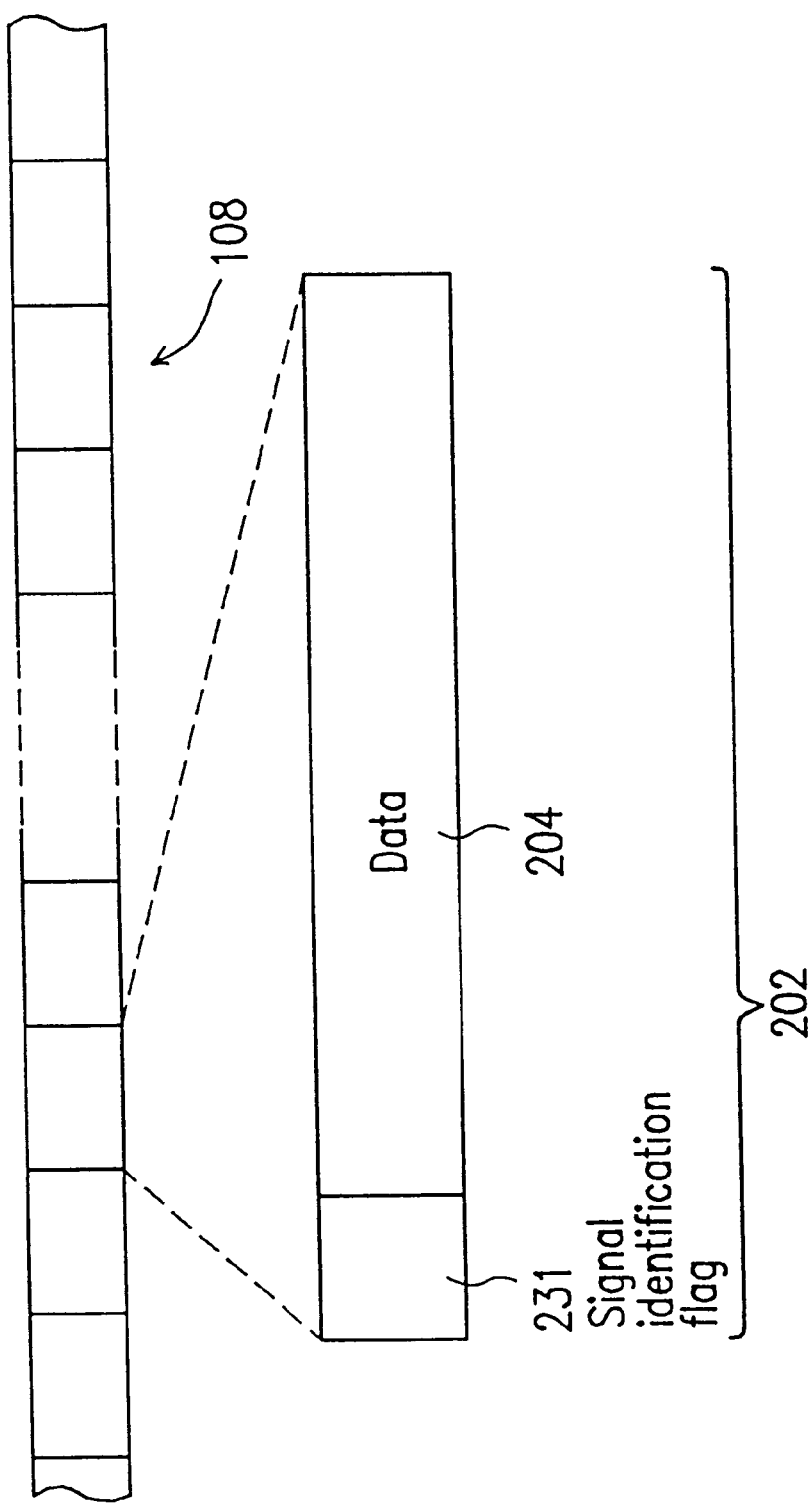
FIG. 23 is a diagram, showing a format for a compressed video signal in the tenth example.

FIG. 23 is a diagram showing a format for the compressed video signal of the tenth example. In FIG. 23, the compressed video signal is composed of a plurality of packets 202. A region for a signal identification flag 231 and a region for data 204 are provided in each packet 202. The signal identification flag 231 is a flag indicating whether the video signal is an interlaced signal or a non-interlaced signal.

First, an interlaced signal or a kind of video signal will be specifically described. As shown in the portion (a) of FIG. 21, an interlaced signal is a video signal in which a plurality of fields composed of odd-numbered scanning lines only and a plurality of fields composed of even-numbered scanning lines only alternately appear. For example, only odd-numbered scanning lines exist in the field 211a at the time t0, whereas only even-numbered scanning lines exist in the field 212a at the time t1. In this case, the frame 215 becomes a frame in which the fields 211a and 212a are synthesized as shown in the portion (b) of FIG. 21. More specifically, among a plurality of scanning lines included in the frame 215, the odd-numbered scanning lines 216 are the scanning lines of the field 211a, while the even-numbered scanning lines 217 are the scanning lines of the field 212a. In this case, since the fields 211a and 212a represent images at different times, a time gap is caused between an odd-numbered scanning line 216 and an even-numbered scanning line 217 in the frame 215. As a result, in the case of extracting and displaying a single image from an interlaced signal, the resulting image becomes blurred. A video signal conformable to an NTSC standard or a currently used television signal is an interlaced signal such as that shown in FIG. 21.

Next, a non-interlaced signal or another kind of video signal will be specifically described. As shown in the portion (a) of FIG. 22, a non-interlaced signal is different from an interlaced signal in that the field 221a includes all the scanning lines. However, the number of fields included within a unit time is one-half of that of an interlaced signal. That is to say, in the case of using the same time axis as that shown in the portion (a) in FIG. 21, fields surely exist at the times t0, t2 and t4 but no fields exist at the times t1 and t3. In this case, since the frame 222 is composed of the field 221a only, no time gap is caused between adjacent scanning lines 223. Therefore, even if a single image is extracted and displayed, the image is not blurred unlike the case of an interlaced signal.

As described above, in the case of transmitting an image corresponding to one frame, it is possible to transmit an image of higher fidelity by extracting a frame signal from a non-interlaced signal. Thus, a compressed video signal is divided into a plurality of packets 202 as shown in FIG. 23 so as to be transmitted. By examining the signal identification flag 231 of a packet, the frame signal extractor 161 shown in FIG. 16 can determine whether a compressed video signal including the packet is an interlaced signal or a non-interlaced signal. The frame signal extractor 161 extracts the frame signal only when the compressed video signal is a non-interlaced signal. The operation which has not been herein described is the same as that of the tenth example.

Though the signal identification flag 231 is located at the top of the packet 202 in FIG. 23, the flag may be located at any other position inside the packet 202. Also, in this example, a video signal is assumed to be either an interlaced signal or a non-interlaced signal. Alternatively, a video signal may be a signal which can be arbitrary switched into an interlaced signal or a non-interlaced signal.

EXAMPLE 13

Figure 24:
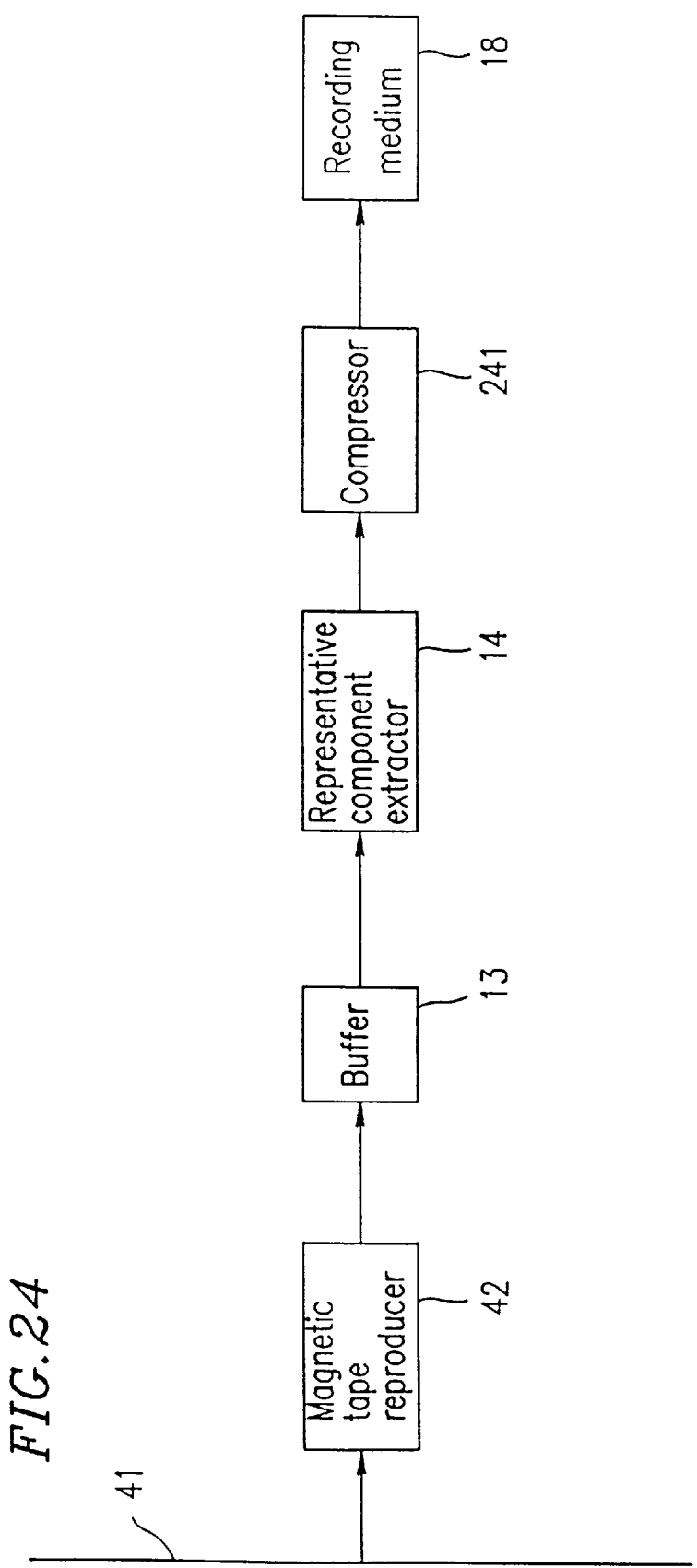
FIG. 24 is a block diagram for a video signal processing apparatus in a thirteenth example of the present invention.

FIG. 24 is a block diagram for a video signal processing apparatus in a thirteenth example of the present invention. In FIG. 24, the reference numeral 241 denotes a compressor.

The data recorded on the magnetic tape 41 is read out by the magnetic tape reproducer 42 and then held in the buffer 13 until data corresponding to one frame has been read out. Only the DC components of the data held in the buffer 13 are extracted by the representative component extractor 14. Since the DC components can also be regarded as a video signal, these components are compressed by the compressor 241, thereby obtaining compressed DC video data. The compressed DC video data obtained by the compressor 241 is recorded onto the recording medium 18.

As described above, in the thirteenth example, by utilizing compressed DC data obtained by further compressing a video composed of DC components, the capacity of video data per unit time can be further reduced.

EXAMPLE 14

Figure 25:
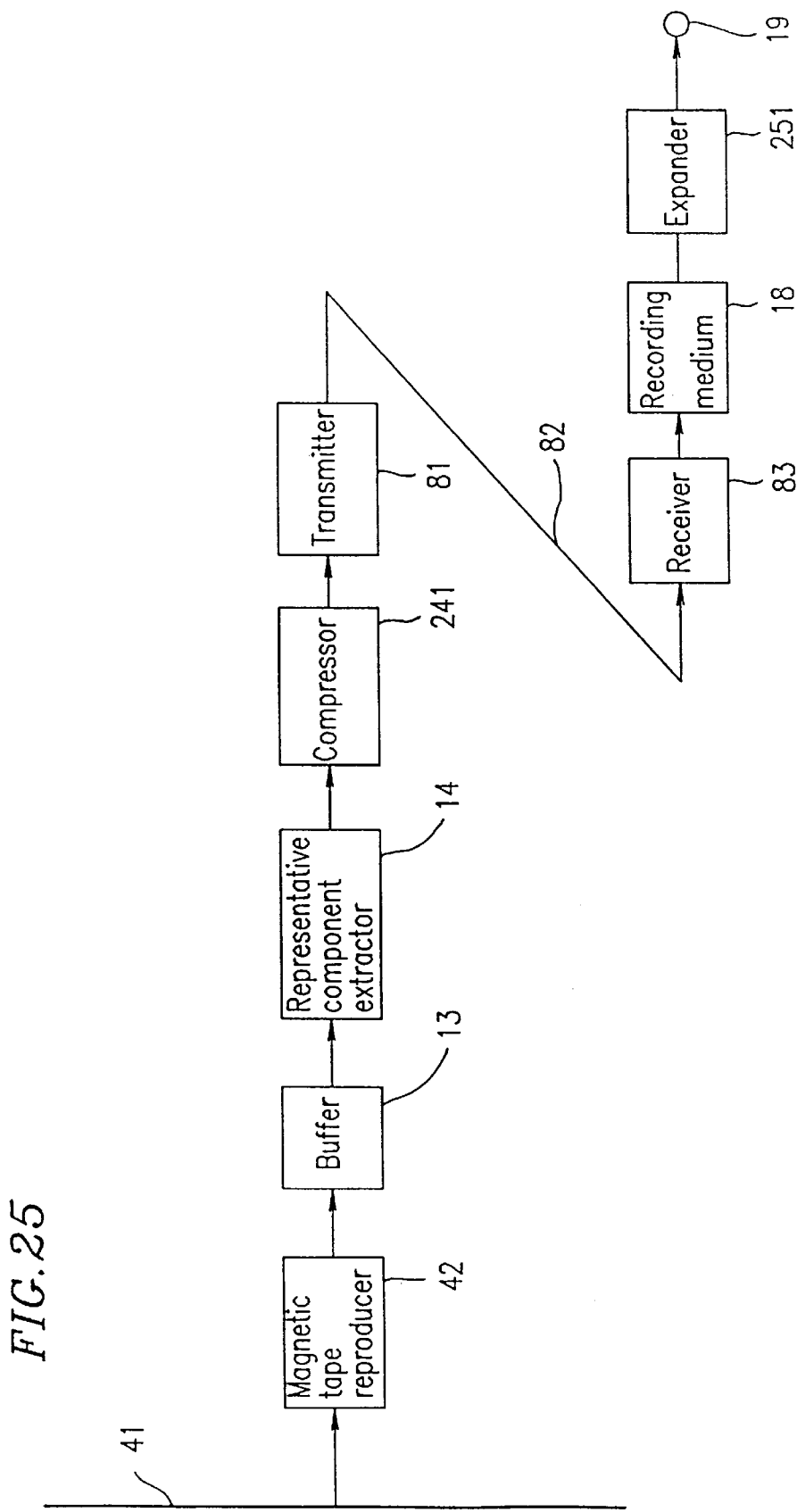
FIG. 25 is a block diagram for a video signal processing apparatus in a fourteenth example of the present invention.

FIG. 25 is a block diagram for a video signal processing apparatus in a fourteenth example of the present invention in FIG. 25, the reference numeral 251 denotes an expander.

Only the points different from those of the thirteenth example will be described below. The compressed DC data obtained by the compressor 241 from the DC components extracted by the representative component extractor 14 is subjected by the transmitter 81 to encoding and packet division for transmission and then transmitted through the external transmission line 82. The transmitted data is restored by the receiver 83 into original data to be recorded onto the recording medium 18.

The compressed DC data recorded on the recording medium 18 is expanded by the expander 251, so that video data composed of DC components only can be obtained. The video data obtained by the expander 251 is output as a plain display image from the display output terminal 19.

As described above, in the fourteenth example of the present invention, by performing a transmission line encoding by further compressing the extracted DC components, the amount of the information to be transmitted can be considerably reduced without damaging the contents of a video signal. As a result, a moving picture can be transmitted even through a transmission line having an extremely low transmission rate.

In the fourteenth example, as soon as data is received by the receiver 83, the received data may be expanded by the expander 251, thereby displaying a plain image without utilizing the recording medium 18.

It is to be noted that any compression method can be employed by the compressor 241 in the thirteenth and the fourteenth examples. In other words, the compressor is not limited in its way to compress the DC component.

In the foregoing examples described above, the representative components are assumed to be the DC components obtained by subjecting each M×N (where M and N are integers) block to a DCT. However, the effects of the present invention can also be attained even when the representative components include higher band components in addition to the DC components. For example, when a block composed of 8×8 components is used as a DCT block, 2×2 components or 4×4 components in the lower band region of the 8×8 block may also be used as the representative components.

Figure 26:
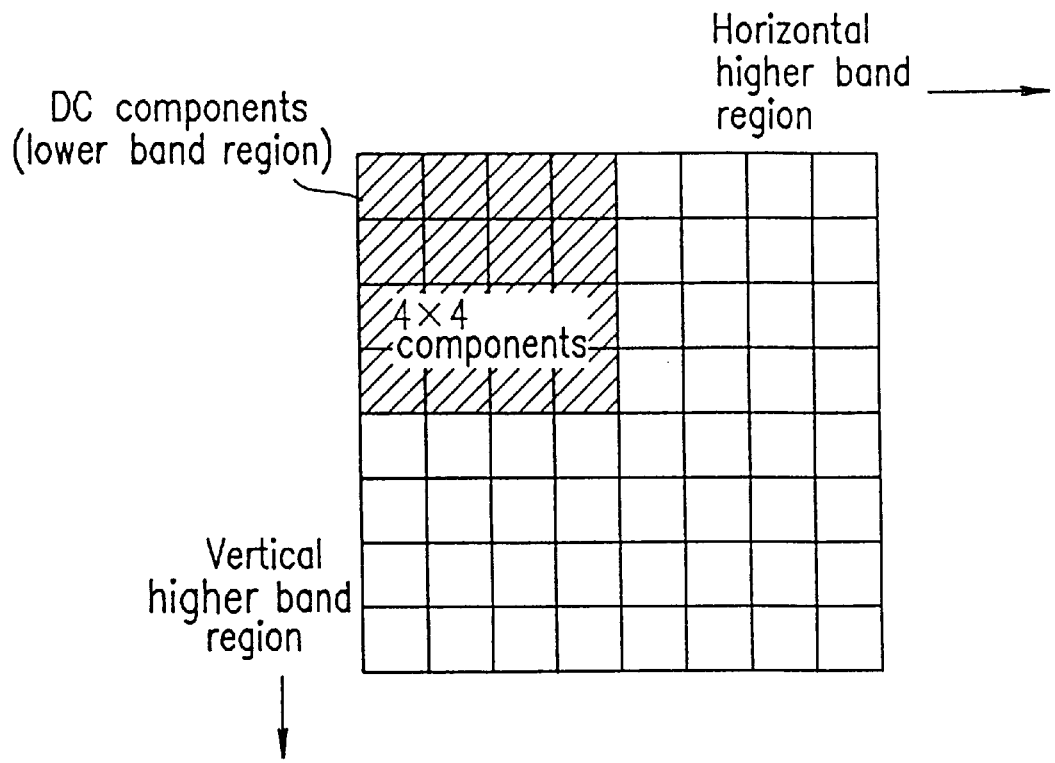
FIG. 26 is a diagram showing an 8×8 block composed of DCT coefficients which are obtained by subjecting an 8×8 pixel block to a DCT.

FIG. 26 is a diagram showing an 8×8 block composed of DCT coefficients which are obtained by subjecting an 8×8 pixel block to a DCT. In FIG. 26, the components shown in the upper left corner are DC components and the other components are AC components. The frequency components in the horizontal direction become higher rightward in the block, while the frequency components in the vertical direction become higher downward in the block. As shown in FIG. 26, 4×4 components on the lower band region may be extracted as the representative components from the 8×8 DCT block.

Moreover, it is not always necessary to extract all the bits representing the DC components. The bit number of the DC components to be extracted can be arbitrarily selected in accordance with a recording capacity or a transmission rate.

The above-described video signal processing method according to the present invention can be implemented by using either software or hardware or both. In the case of implementing the method of the present invention using software, the software can be distributed in the fort of a recording medium in which the software has been recorded or through a communication line or the like.

According to the present invention, at least the following effects can be attained: the contents of a video signal can be recognized at a high speed; the recording capacity can be reduced; and a video signal can be transmitted at a practically permissible rate even through a transmission line having a relatively small transmission capacity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video signal processing apparatus comprising:
    a representative component extractor which receives a video signal separating representative components from non-representative components, thereby obtaining extracted representative components from the combined representative components and non-representative component, wherein the representative components are direct-current (DC) components, and the non-representative components are alternating current (AC) components; and
    a recorder for recording the extracted representative components on to a recording medium but not the non-representative components.

2. A video signal processing apparatus according to claim 1, further comprises a display unit for displaying the extracted representative components thereon.

3. A video signal processing apparatus according to claim 1, further comprising a transmitter for outputting the extracted representative components to a transmission line.

4. A video signal processing apparatus according to claim 3, further comprising:
    a recorder for recording the extracted representative components onto a recording medium; and a selector for selecting transmission frames, to be output to the transmission line, from the extracted representative components which have been recorded on the recording medium by the recorder.

5. A video signal processing apparatus according to claim 1, further comprising:
    a magnetic tape reproducer for reproducing the video signal which includes the separated representative components and non-representative components and recorded on a magnetic tape;
    the representative component extractor obtaining the extracted representative components obtained when the video signal on the recording medium is reproduced with k times speed.

6. A video signal processing apparatus according to claim 1, further comprising:
    a decoder for receiving an encoded video signal, decoding the encoded video signal;
    the representative component extractor obtaining the extracted representative components of the video signal decoded by the decoder;
    a video signal processing apparatus further comprising:
        a display unit for displaying the extracted representative components of the video signal decoded by the decoder thereon; or
        a recorder for recording the extracted representative components of the video signal decoded by the decoder.

7. A video signal processing apparatus according to claim 1, further comprising a compressor for compressing the extracted representative components by the representative component extractor.

8. A video signal processing apparatus according to claim 7, further comprising one of
    a transmitter for outputting the extracted representative components compressed by the compressor from the compressor to a transmission line; and
    a recorder for recording the extracted representative components compressed by the compressor.

9. A video signal processing apparatus comprising:
    a magnetic tape reproducer for reproducing and outputting a video signal which includes representative components and non-representative components and has been recorded on a magnetic tape, wherein the representative components are direct-current (DC) components, and the non-representative components are alternating current (AC) components;
    a representative component extractor for receiving the video signal and separates the representative components from the non-representative components, thereby obtaining extracted representative components from the video signal;
    a disk recorder for recording the extracted representative components obtained by the representative component extractor onto a disk recording medium but not the non-representative components;
    a disk reproducer for reproducing the extracted representative components from the disk recording medium; and
    an editing region setter for controlling a reproducing operation of the magnetic tape reproducer.

10. A video signal processing apparatus according to claim 9, further comprising a magnetic tape recorder for recording the video signal output from the magnetic tape reproducer.

11. A video signal processing apparatus comprising:
    a frame signal extractor for receiving a video signal which includes representative components and non-representative components and outputting a frame signal of one frame, wherein the representative components are direct-current (DC) components, and the non-representative components are alternating current (AC) components;

a representative component extractor for receiving the video signal, extracting the representative components from the video signal, and outputting a representative component signal containing the extracted representative components; and a selector for receiving the frame signal output from the frame signal extractor and the representative component signal output from the representative component extractor and selectively outputting one of these signals in accordance with an externally input control signal.

12. A video signal processing apparatus comprising:

a non-representative component supplementer for receiving representative components, thereby supplementing non-representative components, wherein the representative components are direct-current(DC) components, and the non-representative components are alternating current(AC) components;

a frame signal processor for receiving a video signal and outputting a frame signal representing one frame; and a selector for receiving a signal output from the non-representative component supplementer and a signal output from the frame signal processor and selectively outputting one of these signals in accordance with an externally input control signal.

13. A video signal processing apparatus according to claim 1, further comprising a storage medium for storing the video signals prior to receipt by the representative component extractor, wherein the representative components of the video signals are stored at predetermined regions on the storage medium and the representative component extractor is configured to extract the representative components from the non-representative components based in part on a known offset between at least two of the plurality of predetermined regions on the storage medium at which the representative components are stored.

* * * * *